United States Patent
Yonemoto et al.

(10) Patent No.: US 12,434,075 B2
(45) Date of Patent: Oct. 7, 2025

(54) COUPLED ROBOTIC RADIATION THERAPY SYSTEM

(71) Applicant: CELESTIAL ONCOLOGY INC., Santa Monica, CA (US)

(72) Inventors: Jay Akio Yonemoto, Arcadia, CA (US); Asheber Techane Wagshum, Granada Hills, CA (US)

(73) Assignee: Celestial Oncology Inc., Santa Monica, CA (US)

( * ) Notice: Subject to any disclaimer, the term of this patent is extended or adjusted under 35 U.S.C. 154(b) by 265 days.

(21) Appl. No.: 17/740,902

(22) Filed: May 10, 2022

(65) Prior Publication Data

US 2022/0370833 A1    Nov. 24, 2022

Related U.S. Application Data

(60) Provisional application No. 63/187,175, filed on May 11, 2021.

(51) Int. Cl.
| | |
|---|---|
| *A61N 5/10* | (2006.01) |
| *G16H 20/40* | (2018.01) |
| *G16H 40/63* | (2018.01) |

(52) U.S. Cl.
CPC .......... *A61N 5/1083* (2013.01); *A61N 5/103* (2013.01); *A61N 5/1049* (2013.01); *G16H 20/40* (2018.01); *G16H 40/63* (2018.01); *A61N 2005/1094* (2013.01)

(58) Field of Classification Search
None
See application file for complete search history.

(56) References Cited

U.S. PATENT DOCUMENTS

| | | | | |
|---|---|---|---|---|
| 5,149,074 A | * | 9/1992 | Jarin | A61B 6/04 5/601 |
| 5,207,223 A | * | 5/1993 | Adler | A61B 6/4458 606/130 |
| 5,410,767 A | * | 5/1995 | Barud | A61B 6/04 5/601 |
| 5,835,558 A | * | 11/1998 | Maschke | H05G 1/26 378/198 |
| 6,502,261 B1 | * | 1/2003 | Harwood | A61B 6/0487 5/601 |
| 6,889,695 B2 | * | 5/2005 | Pankratov | A61N 5/1039 128/898 |

(Continued)

FOREIGN PATENT DOCUMENTS

| | | |
|---|---|---|
| CN | 203220692 | 10/2013 |
| EP | 3265176 | 12/2018 |

(Continued)

OTHER PUBLICATIONS

International Report and Written Opinion received in PCT/US2022/028615, dated Aug. 26, 2022.

*Primary Examiner* — David P Porta
*Assistant Examiner* — Djura Malevic
(74) *Attorney, Agent, or Firm* — Knobbe, Martens, Olson & Bear, LLP

(57) ABSTRACT

A dual robot therapy system may be configured to provide a therapy beam (and/or an imaging beam) at each of multiple treatment beam angles that are selected from a much larger set of candidate beam angles than are possible with existing therapy delivery system.

16 Claims, 14 Drawing Sheets

(56) References Cited

U.S. PATENT DOCUMENTS

| | | | | |
|---|---|---|---|---|
| 7,130,372 | B2 * | 10/2006 | Kusch | A61N 5/1081 378/65 |
| 7,186,828 | B2 * | 3/2007 | Guichard | C07D 243/04 540/496 |
| 7,266,176 | B2 * | 9/2007 | Allison | A61N 5/1031 378/65 |
| 7,441,953 | B2 * | 10/2008 | Banks | A61B 6/547 378/197 |
| 7,496,642 | B2 * | 2/2009 | Gill | G06F 16/9574 709/219 |
| 7,638,779 | B2 * | 12/2009 | Herrmann | A61B 6/4458 250/492.1 |
| 7,748,900 | B2 * | 7/2010 | Maschke | A61B 6/4458 378/197 |
| 7,860,550 | B2 * | 12/2010 | Saracen | A61B 6/548 5/601 |
| 8,017,915 | B2 * | 9/2011 | Mazin | A61N 5/1067 378/65 |
| D646,703 | S * | 10/2011 | Wong | D15/199 |
| 8,032,643 | B2 * | 10/2011 | Gill | G06F 16/9574 709/227 |
| 8,086,004 | B2 * | 12/2011 | Kuduvalli | A61N 5/1075 382/128 |
| 8,126,114 | B2 * | 2/2012 | Naylor | A61B 34/30 378/65 |
| 8,160,205 | B2 * | 4/2012 | Saracen | A61B 6/0487 378/68 |
| 8,180,020 | B2 * | 5/2012 | Kilby | A61N 5/10 378/65 |
| 8,262,554 | B2 * | 9/2012 | Sayeh | A61B 6/466 378/65 |
| 8,358,737 | B2 * | 1/2013 | Tanabe | A61N 5/1083 378/92 |
| 8,583,313 | B2 * | 11/2013 | Mian | B61G 7/04 701/19 |
| 8,592,987 | B2 * | 11/2013 | Barth | H01L 24/48 438/618 |
| 8,655,429 | B2 * | 2/2014 | Kuduvalli | B25J 9/1682 600/407 |
| 8,740,880 | B2 * | 6/2014 | Pinault | A61N 5/1049 606/1 |
| 8,745,789 | B2 * | 6/2014 | Saracen | B66C 23/48 5/601 |
| 8,904,582 | B2 * | 12/2014 | Bergfjord | A61G 13/06 5/601 |
| 9,149,656 | B2 * | 10/2015 | Tanabe | A61N 5/1083 |
| 9,326,907 | B2 * | 5/2016 | Marle | A61B 6/0407 |
| 9,526,919 | B2 * | 12/2016 | Liu | A61N 5/1039 |
| 9,694,210 | B2 * | 7/2017 | Liu | A61B 6/486 |
| 9,855,446 | B2 * | 1/2018 | Chang | B25J 18/007 |
| 9,895,559 | B2 * | 2/2018 | Chang | A61N 5/1084 |
| 9,950,195 | B2 * | 4/2018 | Liu | A61N 5/1064 |
| 9,999,786 | B2 * | 6/2018 | Yoshimizu | A61N 5/1065 |
| 10,026,516 | B2 * | 7/2018 | Yoshimizu | G21K 1/02 |
| 10,039,508 | B2 * | 8/2018 | Abramovich | A61B 6/105 |
| 10,070,835 | B2 * | 9/2018 | Vancamberg | A61B 90/50 |
| 10,092,774 | B1 * | 10/2018 | Vanderstraten | G16H 10/60 |
| 10,143,438 | B2 * | 12/2018 | Zhang | A61B 6/4441 |
| 10,183,179 | B1 * | 1/2019 | Smith | A61N 5/1077 |
| 10,245,448 | B2 * | 4/2019 | Heese | G01T 1/29 |
| 10,311,178 | B2 * | 6/2019 | Padoy | A61N 5/1075 |
| 10,342,996 | B2 * | 7/2019 | Jordan | A61N 5/1039 |
| 10,456,599 | B2 * | 10/2019 | Jordan | A61N 5/103 |
| 10,507,339 | B2 * | 12/2019 | Filiberti | A61N 5/107 |
| 10,549,117 | B2 * | 2/2020 | Vanderstraten | A61N 5/1031 |
| 10,609,806 | B2 * | 3/2020 | Roecken | A61N 5/1043 |
| 10,702,716 | B2 * | 7/2020 | Heese | A61N 5/1071 |
| 10,745,253 | B2 * | 8/2020 | Saracen | A61B 6/4458 |
| 10,806,948 | B2 * | 10/2020 | Jordan | A61B 6/4014 |
| 10,843,011 | B2 * | 11/2020 | Trail | H01J 37/073 |
| 10,850,124 | B2 * | 12/2020 | Vanderstraeten | G16H 50/50 |
| 10,898,730 | B2 * | 1/2021 | Smith | A61N 5/1067 |
| 10,918,886 | B2 * | 2/2021 | Smith | G16H 50/50 |
| 10,953,243 | B2 * | 3/2021 | Liu | A61N 5/1049 |
| 10,960,231 | B2 * | 3/2021 | Mansfield | A61N 5/1049 |
| 10,970,926 | B2 * | 4/2021 | Kiely | A61B 6/584 |
| 11,000,701 | B2 * | 5/2021 | Lu | A61N 5/1039 |
| 11,033,760 | B2 * | 6/2021 | Sheng | A61N 5/1083 |
| 11,058,895 | B2 * | 7/2021 | Chang | A61N 5/1083 |
| 11,083,420 | B2 * | 8/2021 | Suga | A61B 6/0407 |
| 11,090,508 | B2 * | 8/2021 | Folkerts | A61N 5/1031 |
| 11,103,727 | B2 * | 8/2021 | Folkerts | G06T 7/0012 |
| 11,116,995 | B2 * | 9/2021 | Khuntia | A61N 5/1031 |
| 11,120,622 | B2 * | 9/2021 | Kiely | A61N 5/1049 |
| 11,173,323 | B2 * | 11/2021 | Munbodh | G16H 40/63 |
| 11,185,985 | B2 * | 11/2021 | Nissen | B25J 9/1664 |
| 11,273,326 | B2 * | 3/2022 | Ohishi | A61N 5/10 |
| 11,278,743 | B1 * | 3/2022 | Frederick | G06V 10/25 |
| 11,280,747 | B2 * | 3/2022 | Sauerwein | A61B 6/032 |
| 11,291,859 | B2 * | 4/2022 | Abel | A61N 5/1038 |
| 11,324,970 | B2 * | 5/2022 | Filiberti | A61N 5/1049 |
| 11,331,518 | B2 * | 5/2022 | Jordan | A61N 5/1039 |
| 11,348,755 | B2 * | 5/2022 | Star-Lack | A61N 5/1077 |
| 11,358,008 | B2 * | 6/2022 | Voronenko | A61B 6/035 |
| 11,478,664 | B2 * | 10/2022 | Trail | A61N 5/1077 |
| 11,529,108 | B2 * | 12/2022 | Tai | A61B 6/4233 |
| 11,529,532 | B2 * | 12/2022 | Mansfield | A61N 5/1067 |
| 11,534,625 | B2 * | 12/2022 | Khuntia | A61N 5/1045 |
| 11,541,252 | B2 * | 1/2023 | Folkerts | G16H 20/40 |
| 11,554,271 | B2 * | 1/2023 | Smith | A61N 5/1081 |
| 11,583,704 | B2 * | 2/2023 | Gaderlund | A61N 5/1067 |
| 11,590,364 | B2 * | 2/2023 | Abel | A61N 5/1077 |
| 11,598,720 | B2 * | 3/2023 | Stacey | G01N 35/00603 |
| 11,602,647 | B2 * | 3/2023 | Gou | A61N 5/1048 |
| 11,612,767 | B2 * | 3/2023 | Zhou | A61B 6/566 378/65 |
| 11,645,768 | B2 * | 5/2023 | Berlinger | G06T 7/33 382/131 |
| 11,654,305 | B2 * | 5/2023 | Benali | A61N 5/1069 128/845 |
| 11,673,003 | B2 * | 6/2023 | Vanderstraeten | A61N 5/1045 378/65 |
| 11,678,856 | B2 * | 6/2023 | Pigott | G01T 7/00 378/87 |
| 11,679,281 | B1 * | 6/2023 | Schnarr | A61N 5/1039 378/62 |
| 11,684,804 | B2 * | 6/2023 | Filiberti | A61B 6/0407 600/427 |
| 11,691,029 | B2 * | 7/2023 | Jordan | A61N 5/1081 378/65 |
| 11,712,579 | B2 * | 8/2023 | Abel | A61N 5/103 250/492.23 |
| 11,717,705 | B1 * | 8/2023 | Kerns | A61N 5/1075 378/207 |
| 11,759,657 | B2 * | 9/2023 | Liu | A61N 5/1084 600/1 |
| 11,766,574 | B2 * | 9/2023 | Vanderstraten | A61N 5/103 600/1 |
| 11,779,407 | B2 * | 10/2023 | Pigott | G01T 7/00 378/207 |
| 11,794,036 | B2 * | 10/2023 | Bassalow | A61N 5/1049 |
| 11,801,398 | B2 * | 10/2023 | Voronenko | A61B 6/4435 |
| 11,813,481 | B2 * | 11/2023 | Pal | A61N 5/107 |
| 11,819,711 | B2 * | 11/2023 | Wang | A61N 5/1075 |
| 11,854,761 | B2 * | 12/2023 | Star-Lack | G21K 1/10 |
| 11,857,805 | B2 * | 1/2024 | Purwar | H01J 35/14 |
| 11,865,361 | B2 * | 1/2024 | Perez | A61N 5/1031 |
| 11,865,364 | B2 * | 1/2024 | Smith | A61N 5/103 |
| 11,878,187 | B2 * | 1/2024 | Frederick | A61N 5/1037 |
| 11,883,684 | B2 * | 1/2024 | Yan | G06T 7/70 |
| 11,896,850 | B2 * | 2/2024 | Jordan | A61B 6/4014 |
| 11,896,851 | B2 * | 2/2024 | Van Heteren | A61N 5/1067 |
| 11,959,865 | B2 * | 4/2024 | Sauerwein | A61B 6/032 |
| 12,211,151 | B1 * | 1/2025 | Chiou | G06T 19/003 |
| 2003/0048875 | A1 * | 3/2003 | Mihara | A61N 5/10 378/196 |
| 2003/0102134 | A1 * | 6/2003 | Reynolds | E21B 19/006 166/85.4 |
| 2004/0119597 | A1 * | 6/2004 | Petzold | B66C 23/80 340/679 |

(56) References Cited

U.S. PATENT DOCUMENTS

| | | | |
|---|---|---|---|
| 2004/0216232 A1* | 11/2004 | Bradcovich | A61B 6/0442 5/601 |
| 2005/0234327 A1* | 10/2005 | Saracen | A61B 6/548 600/407 |
| 2006/0080401 A1* | 4/2006 | Gill | G06F 16/9574 709/217 |
| 2008/0013687 A1* | 1/2008 | Maurer | G21K 1/046 600/1 |
| 2008/0177754 A1* | 7/2008 | Gill | G06F 16/9574 |
| 2008/0301872 A1* | 12/2008 | Fahrig | A61B 6/0487 5/81.1 R |
| 2009/0003532 A1* | 1/2009 | Weber | A61B 6/0487 378/209 |
| 2010/0069920 A1* | 3/2010 | Naylor | A61B 34/71 606/130 |
| 2010/0104068 A1* | 4/2010 | Kilby | A61N 5/1031 378/65 |
| 2013/0336449 A1* | 12/2013 | Tanabe | A61N 5/1067 378/65 |
| 2014/0034061 A1* | 2/2014 | Marle | A61B 6/4494 128/845 |
| 2015/0059095 A1* | 3/2015 | Bergfjord | A61G 13/06 5/611 |
| 2015/0135438 A1* | 5/2015 | Marugg | A61G 13/04 5/608 |
| 2015/0327818 A1* | 11/2015 | Buck | A61G 13/04 5/608 |
| 2016/0195390 A1* | 7/2016 | Nissen | B64F 5/60 901/44 |
| 2017/0128750 A1* | 5/2017 | Filiberti | A61N 5/1065 |
| 2017/0156684 A1* | 6/2017 | Van De Rijdt | A61B 6/0487 |
| 2017/0220716 A1* | 8/2017 | Padoy | A61N 5/1048 |
| 2018/0056090 A1* | 3/2018 | Jordan | A61N 5/1039 |
| 2018/0085603 A1* | 3/2018 | Kruesi | A61B 6/04 |
| 2019/0054317 A1* | 2/2019 | Chang | A61N 5/1067 |
| 2019/0255362 A1* | 8/2019 | Voronenko | A61B 6/037 |
| 2019/0282831 A1* | 9/2019 | Jordan | A61N 5/103 |
| 2019/0358471 A1* | 11/2019 | Raymond | A61B 6/4092 |
| 2019/0366125 A1* | 12/2019 | Petterson | A61B 6/03 |
| 2019/0380666 A1* | 12/2019 | Sheng | A61B 6/4482 |
| 2020/0047000 A1* | 2/2020 | Jordan | A61N 5/1037 |
| 2020/0061392 A1* | 2/2020 | Filiberti | A61N 5/1069 |
| 2020/0206537 A1* | 7/2020 | Liu | A61N 5/1084 |
| 2020/0405375 A1* | 12/2020 | Shelton, IV | A61B 18/1815 |
| 2020/0406063 A1* | 12/2020 | Petterson | A61B 6/4092 |
| 2021/0031052 A1* | 2/2021 | Jordan | A61N 5/1081 |
| 2021/0146159 A1* | 5/2021 | Liu | A61N 5/1049 |
| 2021/0178193 A1* | 6/2021 | Spotts | A61N 5/1044 |
| 2021/0353966 A1* | 11/2021 | Michaud | A61N 5/1044 |
| 2021/0370101 A1* | 12/2021 | Michaud | A61N 5/1067 |
| 2021/0387022 A1* | 12/2021 | Raymond | G21K 1/10 |
| 2021/0393987 A1* | 12/2021 | Michaud | A61N 5/1044 |
| 2021/0393988 A1* | 12/2021 | Raymond | A61N 5/1078 |
| 2022/0023667 A1* | 1/2022 | Sheng | A61N 5/1083 |
| 2022/0219017 A1* | 7/2022 | Filiberti | A61N 5/1042 |
| 2022/0241610 A1* | 8/2022 | Jordan | A61N 5/1037 |
| 2024/0238617 A1* | 7/2024 | Roberts | A61N 5/1001 |

FOREIGN PATENT DOCUMENTS

| | | |
|---|---|---|
| JP | 2014-000128 | 1/2014 |
| KR | 10-2014-0063192 | 5/2014 |

* cited by examiner

COUPLED ROBOTIC RADIATION THERAPY SYSTEM

FIELD

Improvements to delivery of radiation therapy.

DESCRIPTION OF THE RELATED ART

Modern radiation therapy techniques tend to rely on bulky machinery with a limited scope of volumetric angles at which therapy can be administered.

SUMMARY

As discussed herein, a dual robot radiation therapy system may be configurable to provide a therapy beam (and/or an imaging beam) from a much larger set of angle about a treatment area of a patient. For example, one embodiment of a radiation therapy system described herein may be configured to provide a therapy beam at any of the 4π (or "4pi") angles intersecting the treatment area, while optimizing the beam selection process (e.g., the process of selecting feasible beam angles for delivery of a therapy beam to a particular treatment area) by eliminating many of the candidate beams (e.g., the 1162 beam angles possible in a 4pi sphere) prior to (and/or as part of) developing the radiation treatment plan for the patient, pre-operatively during a patient registration process, and/or intra-operatively.

DETAILED DESCRIPTION

Figure 1:
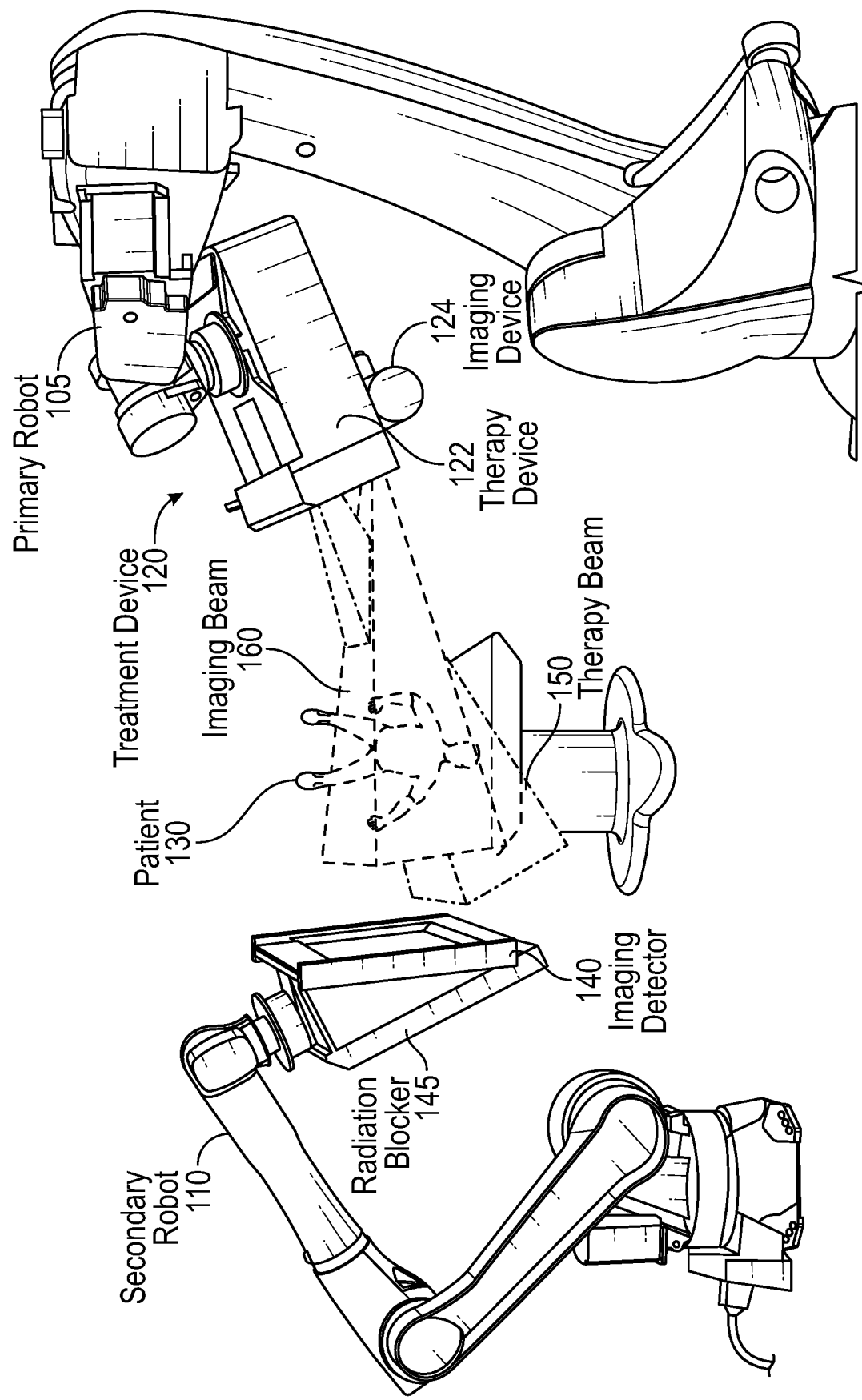
FIG. 1 illustrates an example treatment environment including a primary robot and a second robot.

Described herein are systems and methods for radiation treatment planning and delivery of radiation therapy to a patient, and more particularly, to a treatment area of a patient. To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Tumor: an abnormal growth of tissue resulting from uncontrolled, progressive multiplication of cells. Tumors can be benign or malignant.

Tumor bed: an anatomical area of a patient (e.g., a human or other mammal) where a tumor exists (pre-operative tumor bed) and/or an area surrounding a surgically removed tumor (post-operative tumor bed), such as a cavity from which a tumor was surgically removed. Even after surgical removal of a tumor, the remaining tumor bed of the patient may include tumor cells.

Treatment area: an anatomical area that is targeted for delivery of radiation, such as from one or more radiation therapy devices. A treatment area may include some or all of a tumor bed.

Isocenter: A point in space about which a treatment device moves to provide a therapy beam. In some embodiments, the isocenter may be designated at the treatment area (or a portion of the treatment area) of a patient. Some treatment plans may include multiple isocenters, such as to provide therapy to multiple treatment areas associated with multiple tumors.

Therapy Device: any device or system that provides a high-energy radiation (and/or other therapy) beam. For ease of illustration, examples herein may refer to generation of therapy beams by a linear accelerator ("linac"). However, any other type of therapy device, e.g., a proton therapy device, may be used in place of an x-ray therapy device. The point of a robot where a therapy beam exits the robot may be referred to as a tool center point (TCP). In some embodiments, beams and beam angles may be defined with reference to positions of the TCP of the primary robot (and/or the TCP of the secondary robot).

Therapy Beam: energy, delivered by a therapy device, focused towards an isocenter of a patient along a therapy longitudinal axis. For ease of illustration, examples herein may refer to (high energy) X-ray therapy beams. However, the radiation therapy systems discussed herein may be used with any other type of therapy beam in place of an X-ray therapy beam. For example, a proton therapy beam (which uses protons rather than X-rays) may be used rather than, or in addition to, an X-ray therapy beam.

Imaging Device (or "Imaging Source"): any device or system that provides a low-energy imaging beam configured for detection by an imaging detector.

Imaging Beam: energy, delivered by an imaging device, that is focused towards an isocenter of a patient along an imaging longitudinal axis. For ease of illustration, examples of imaging beams may refer to (low energy) X-ray beams. However, the systems discussed herein may be used with any other type of imaging beam, such as Computed Tomography ("CT"), magnetic resonance imaging ("MRI"), Ultrasound ("US"), Positron emission tomography ("PET"), Nuclear Medicine ("NM"), Fluoroscopy ("FL"), and/or any other type of imaging.

Treatment Device: a therapy device or a therapy device mechanically coupled with an imaging device. As discussed herein, a treatment device is typically a combined imaging and therapy device that move together. However, a treatment device may include only a therapy device, such as in the case where an imaging device is not used or the imaging device is independently movable with reference to the therapy device. As discussed herein, an imaging device and a therapy device may each be coupled to a robotic arm so that the imaging and therapy devices (the "treatment device") move together with movements of the robotic arm. A Candidate beams: beams that could be used to deliver therapy to a treatment area of a patient. Candidate beams may include all of the beam angles from which a therapy device may be positioned to deliver radiation to a treatment isocenter, such as based on different rotations and movements of the therapy device, treatment couch, and/or the patient. For example, if a therapy device is moveable with 6 degrees of freedom, up to 1,162 candidate beams are available for delivery of therapy. If other components of the therapy system, e.g., the patient couch, are moveable in one or more dimensions, the quantity of candidate beams may be exponentially larger.

Treatment beams: a subset of the candidate beams that are selected for use in delivering a therapy beam (where "therapy beam" may include varying energy levels of therapy delivered at different treatment beam locations). For example, in an implementation where 1,162 candidate beams are available, a treatment planning system may perform a first (gross) beam screening to filter out beams that might cause a collision of the treatment device with another object in the treatment room (e.g., the patient, a wall, table, etc.) or that are otherwise unreachable by the therapy device, and then further filter the candidate beams to optimize delivery of radiation to the patient. In some embodiments, a quantity of treatment beams included in a treatment plan is limited based on a user provided input to the treatment planning software (e.g., five, 10, 15, 20, etc.) so the software planning system performs various filtering of the available candidate beams until the predetermined quantity of optimal beams is determined. In other embodiments, the treatment planning software may indicate all suitable beams and a user of the software may select the treatment beams for use in therapy delivery.

Linear Accelerator ('linac'): a device used to generate external beam radiation ("EBR") for treatment of disease, such as cancer. Components of a linac may include an accelerating waveguide, a magnetron, cooling, waveguide isolators, waveguide plenums, sensors, and/or other components. A linac may be configured to deliver high-energy (e.g., 6 MV or more) radiation (e.g., x-rays or other radiation) to a particular treatment area of the patient's body, such as the location of a tumor and/or a tumor cavity that remains after portions (or all) of the tumor have been surgically removed.

Components of a linac may be housed in a compact radiation head (or linac head) configured to move in a broad range of solid angles (e.g., a near-complete spherical outline) around a standard or custom patient couch (e.g., table on which the patient rests during treatment. For example, the isolator may be disposed in a parallel configuration with the accelerating waveguide. As a further example, the magnetron may be perpendicular to the isolator and/or the accelerating waveguide. This compact configuration of the linac may increase clinical efficiency by allowing the device (e.g., with the assistance of a mechanical, e.g., robotic, arm) to be maneuvered with six or more degrees of freedom inside of a treatment room.

A compact therapy device (e.g., linac or other therapy device) may allow delivery of therapy beams from an increased range of angles, which may maximize the dose to the target treatment area (e.g., tumor) while minimizing the dose to healthy tissues. For example, a compact therapy device may allow a mechanical arm to move the therapy device to areas that were previously unreachable with other treatment systems and/or to tailor a dose profile to conform as much as possible to the treatment area (e.g., a volume of tissue).

Treatment Planning Software: software that aids a user, or automatically generates, a treatment plan. A treatment plan may indicate, for example, a radiation dosage that a radiation oncologist has prescribed for administration to a treatment area of a patient. In some embodiments, a treatment area may include multiple tumor sites, which each may be associated with an isocenter (e.g., center of the treatment area) and a planning target value ("PTV"), for example. Thus, in some embodiments a treatment planning software may allow a user to define a radiation dosage to each of the individual PTVs. For example, a first PTV of a patient may be prescribed a maximum dosage of 5,000 centigrays (cGy), while a second PTV is prescribed a maximum dosage of 2,000 cGy. In embodiments where multiple PTVs are indicated in the treatment plan, the planning software define separate isocenter for each of the PTVs. A treatment plan may further indicate positions and/or angles (e.g., treatment beams) from which to deliver radiation. A treatment plan may indicate a shape of the therapy beam that is generated, such as through manipulation of a dynamic multileaf collimators, which can be programmed to minimize impact to healthy and/or radiation sensitive tissues. Increasing dose conformity can allow boosting the dose to the treatment volume, allowing higher probability of tumor control. A treatment plan may include a treatment path indicating an optimized sequence (e.g., order) of movement of the robots (e.g., movement of the TCP to a position of a next treatment beams) between treatment beams Robot Guidance System: a computing system comprising one or more computer processors executing software instructions configured to instruct movements of at least one robot, and typically both a primary robot and a secondary robot according to a treatment plan. In some embodiments, a robot guidance system controls other aspects of the treatment system, such as power level of the radiation device, processing of images from the imaging detector, real-time collision avoidance, and/or any other aspects.

Example Therapy System

In one embodiment, an image guided therapy system includes two robotic arms (also referred to herein generally as "robots") that are independently movable to deliver radiation therapy to a patient, while also imaging the patient (e.g., with X-ray) for accurate delivery of radiation. In some embodiments, imaging may be performed based on one or both of imaging (e.g., low-energy) and therapy (e.g., high-energy) beams. As shown in FIG. 1, for example, a first robot (e.g., a primary robot 105) may be coupled to a treatment device 120, which includes both a therapy device 122 and an imaging device 124. Coupling of both the therapy device 122 and the imaging device 124 with the primary robot 105 results in simultaneous and equivalent movements of the therapy and imaging devices together. Further details and examples of a treatment device that includes mechanically coupled imaging and therapy devices are discussed further below with reference to FIGS. 2-3.

In the embodiment of FIG. 1, the primary robot 105 is configured to move to various positions about a patient 130 to deliver radiation therapy to a prescribed area of the patient. In one example embodiment, the primary robot 105 includes three mechanical articulation points that allow movement of the imaging and therapy device 120 in accordance with instructions provided by a treatment planning device. In other implementations, other types of robots may be used, such as robots that have fewer or additional mechanical articulation points or that move along the surface of a floor, ceiling, or wall, for example.

The design of the various components of a radiation device (e.g., a linac) may be arranged in a way that reduces the overall size of the radiation head. Accordingly, a more compact standing waveguide may be installed in the radiation head. The compact size and/or light weight of the radiation device can allow one or more mechanical arms of the primary robot to move the radiation head around a patient in a treatment bed and/or within a treatment room through a range of angles comprising up to 360-degrees about a first axis defined by the intersection of the x- and y-planes as well as 360-degrees about an orthogonal axis.

In the embodiment of FIG. 1, a second robot (e.g., a secondary robot 110) is coupled to an imaging (e.g., x-ray) detector 140 and a radiation blocker 145. In this embodiment, the imaging detector 140 is configured to detect x-ray radiation to generate images, such as to track position of a treatment area of a patient (e.g., a tumor). The radiation blocker 145 is configured to block (e.g., by absorbing) potentially harmful radiation from reaching healthy tissue of the patient, other persons in the treatment room or even outside the treatment room. Advantageously, the radiation blocker 145 may be positioned by the secondary robot 110 to maximize blockage of the therapy beam 150. The radiation blocker may comprise lead, tungsten, and/or other high-Z materials.

While examples herein illustrate particular robot configurations (e.g., the primary robot 105 and secondary robot 110), any other mechanisms for movement of the related components may instead be used. For example, one or both of the robots 105, 110 may be replaced by other types, sizes, configurations, etc. of machinery that is programmable to move a treatment device and a corresponding imaging and radiation blocking device about a treatment area of the patient. In some embodiments, the machinery may be partially and/or fully operated manually.

Figure 2:
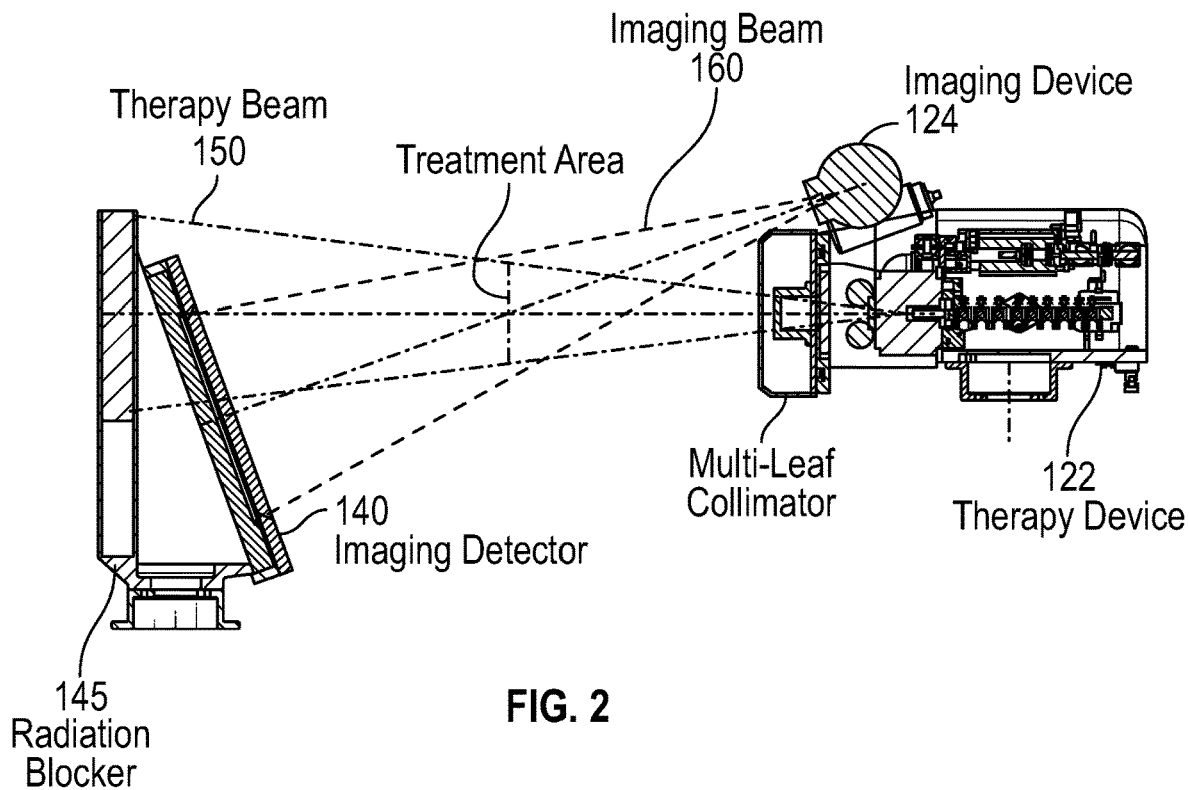
FIG. 2 is a cross-sectional view of certain components of a treatment system.
Figure 3:
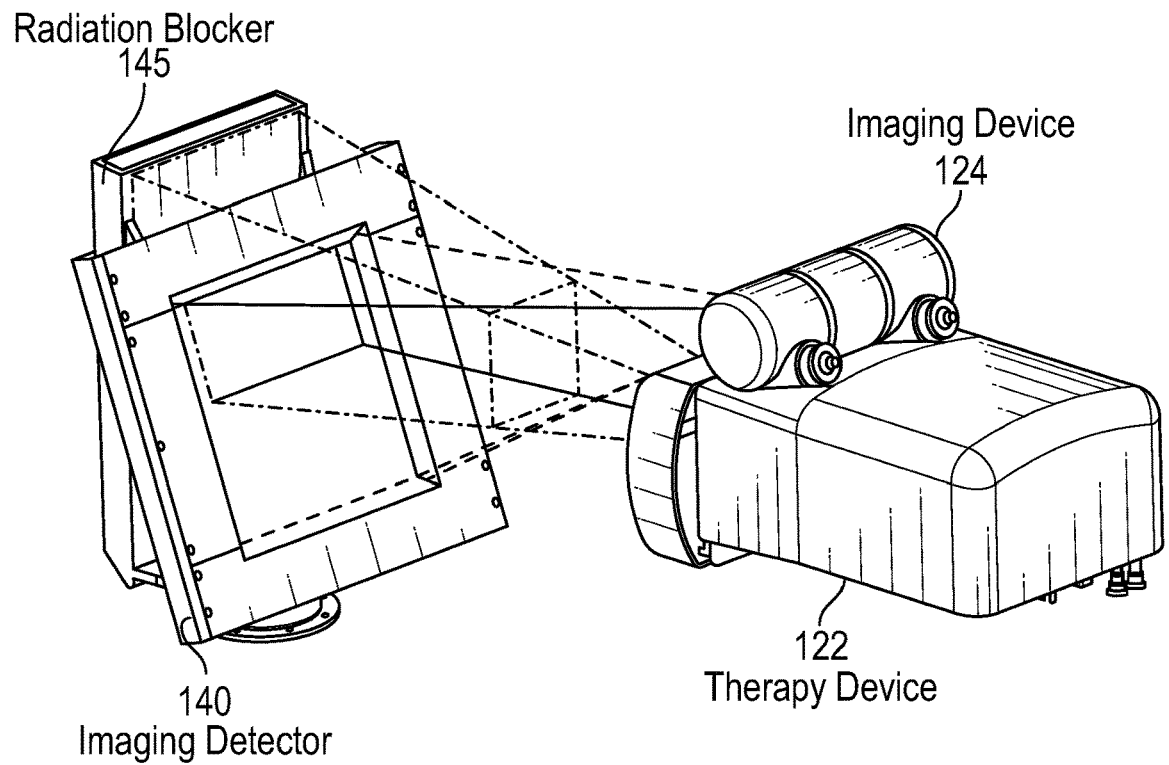
FIG. 3 is a perspective view of certain components of a treatment system.

FIG. 2 is a cross-sectional and FIG. 3 is a perspective view of certain components of FIG. 1, according to one embodiment. In this example, the imaging device 124 (e.g., an x-ray source) is shown mounted atop the therapy device 122 (e.g., a linear accelerator in this example) to allow in-room imaging during patient registration and/or during delivery of radiation from the therapy device. In some embodiments, the imaging device 124 may be independently movable with reference to the therapy device 122, such as to rotate up and down, to provide an increased imaging area for any position of the primary robot 105.

Advantageously, because the imaging beam 160 and the therapy beam 150 are substantially collinear (e.g., define an intersection angle at an the isocenter of less than about 35°, or less depending on the implementation), the imaging provides a "beam eye view", rather than a view that is orthogonal to the therapy beam which may be provided in some other radiation therapy systems.

Figure 4A:
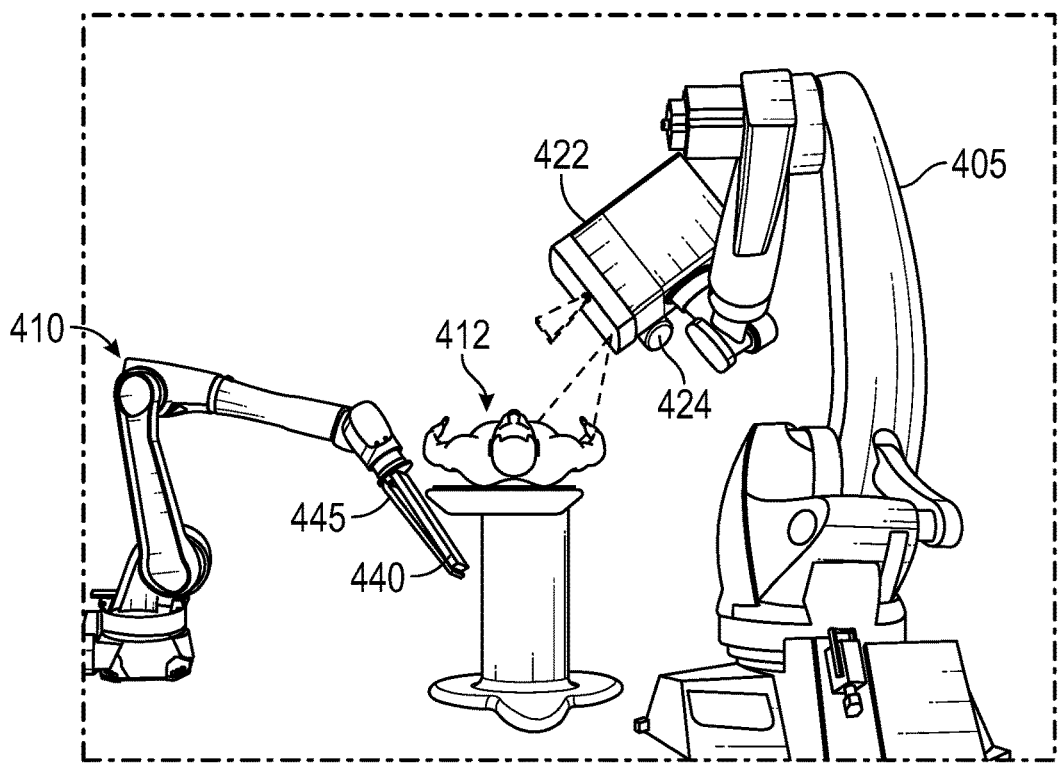
FIGS. 4A and 4B illustrate example alignments of a primary robot and a secondary robot with reference to a patient.
Figure 4B:
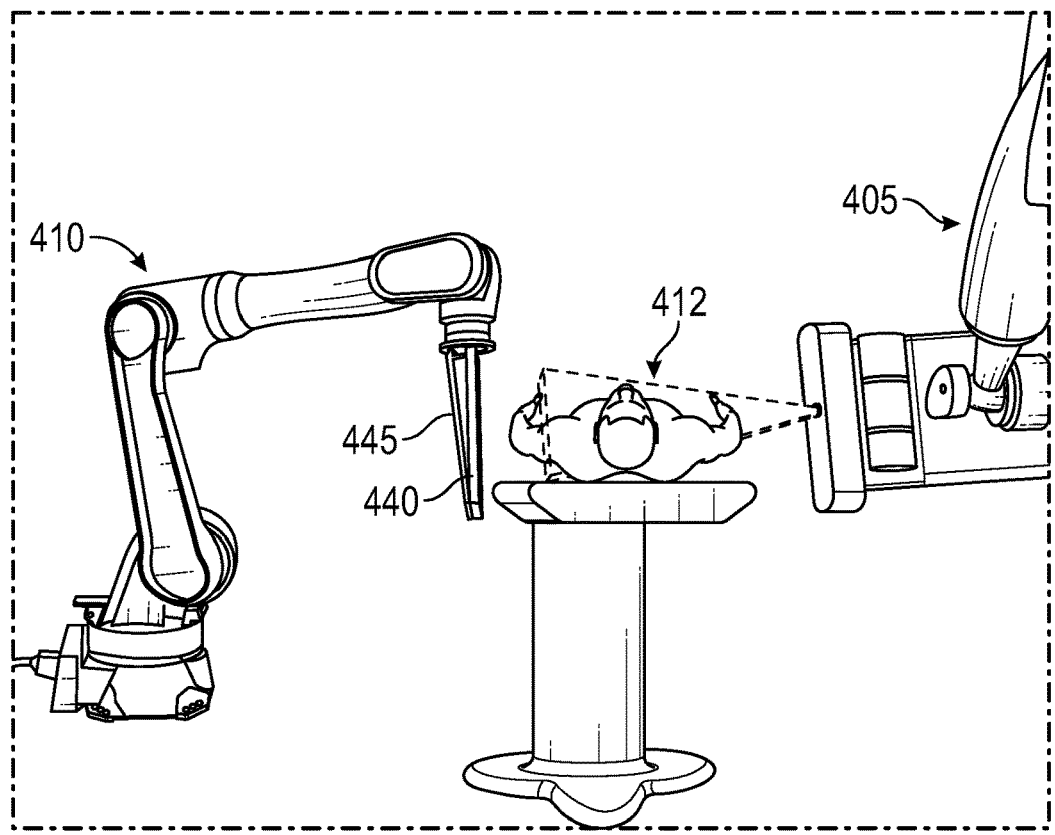

FIGS. 4A and 4B illustrate example alignments of a primary robot 405 and a secondary robot 410 with reference to a patient 412. As shown in these two examples, the secondary robot 410 may be positioned so that the imaging detector 440 receives the imaging beams from the imaging device 424 and the radiation blocker 445 receives much of the therapy beam from the therapy device 422. As shown in these examples, the imaging detector 440 and radiation blocker 445 may advantageously be moved by the secondary robot 410 to many different positions and orientations so that they are precisely aligned with the therapy and imaging beams.

Figure 5:
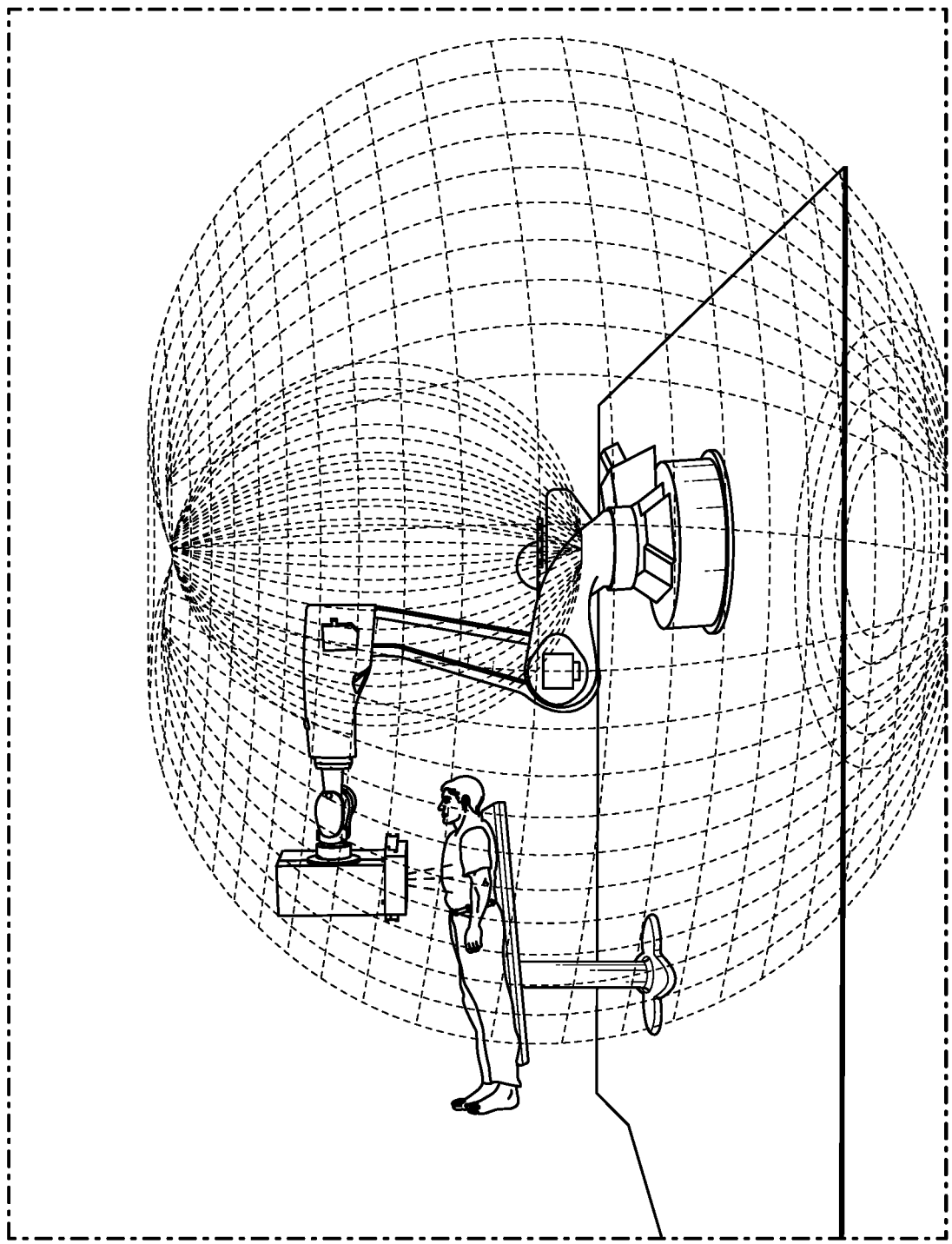
FIG. 5 illustrates one example of available positions of a primary robot with reference to a patient.

FIG. 5 illustrates, for example, available positions of a primary robot, e.g., locations where a therapy beam may originate, such as from a TCP of the primary robot, with reference to a patient. Depending on the mounting position of the primary robot, the mechanical articulation capabilities of the robot, and the like, additional and/or different angles and placements of the therapy and imaging devices may be possible. In some embodiments, a secondary robot (not shown) may include a similar quantity and configuration of positions.

Figure 6:
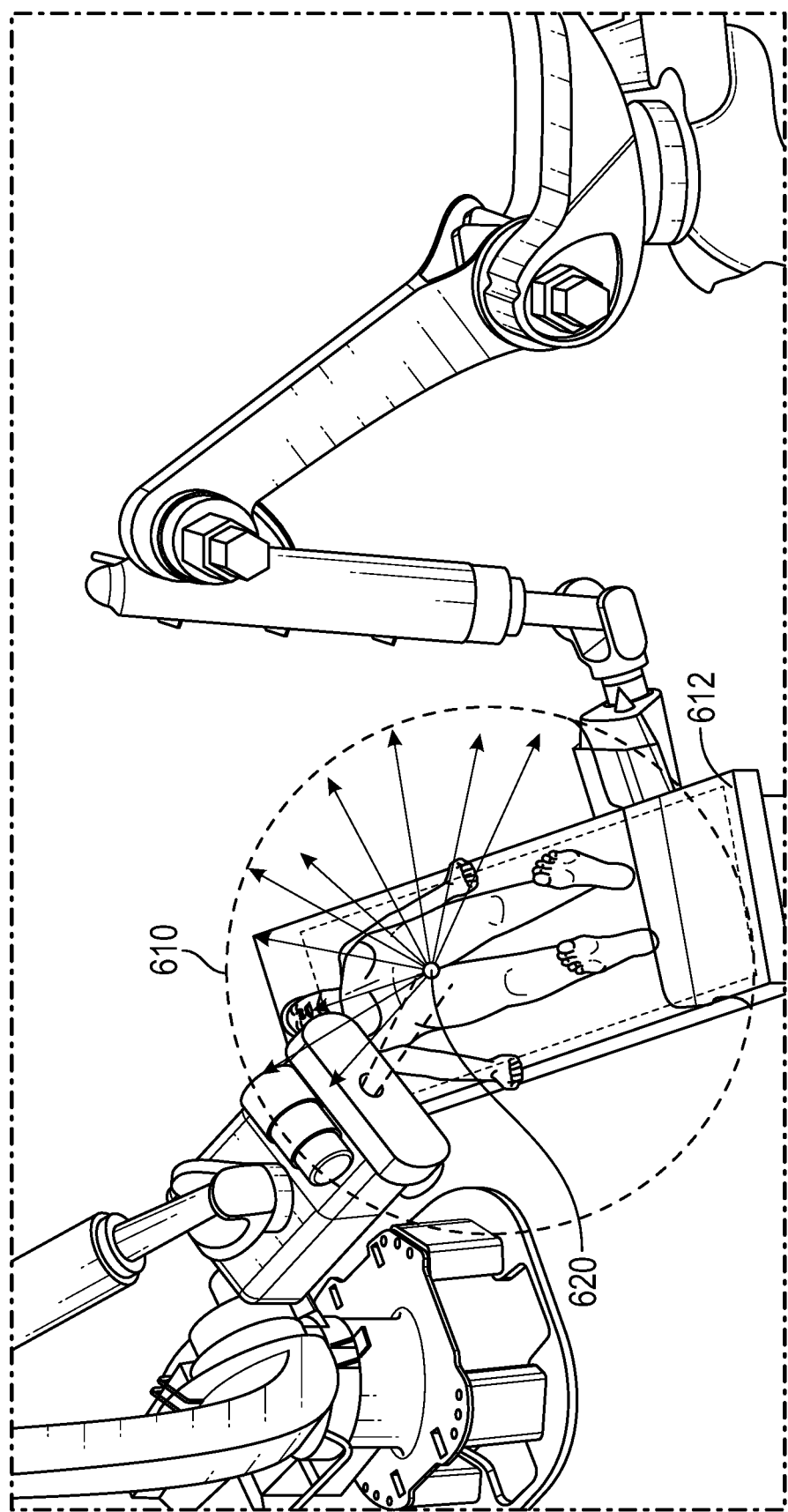
FIG. 6 is an example user interface that may be provided as part of a treatment planning system.

FIG. 6 is an example user interface that may be provided as part of a treatment planning system. For example, treatment planning software may be executed (e.g., locally and/or in the cloud) on a computer operated by a user that is involved in planning radiation treatment for a patient, such as an oncologist, radiation oncologist, other physician, technician, or other individual. The user interface of FIG. 6 may be presented after candidate beams are filtered based on detected likely collisions, optimization of therapy delivery, and/or a filtering of candidate beams to a predetermined (e.g., user determined) quantity of treatment beams.

The example of FIG. 6 includes a possible beams sphere 610 indicating the possible locations of the therapy device (e.g., the TCP) about an isocenter 620 of a patient positioned on a treatment couch 612. In this example, the possible locations are substantially equidistant from the isocenter 620 and extend in all x, y, z directions from the isocenter 620. In the example of FIG. 6, the treatment beams are shown as arrows originating at the isocenter and ending at the perimeter of the sphere 610. These treatment beams (e.g., 10 shown in FIG. 6) are the remaining set of candidate beams (e.g., 1162 candidate beams) after filtering for possible collisions, optimization of the treatment plan, and/or reducing to a predetermined number. In some embodiments, the sphere 610 includes color coding on the perimeter of the sphere and/or within the volume of the sphere 610 to indicate likelihood of a collision at each location. For example, areas where a collision is very unlikely may be colored green, while areas where a collision if very likely may be colored red or purple.

Figure 7:
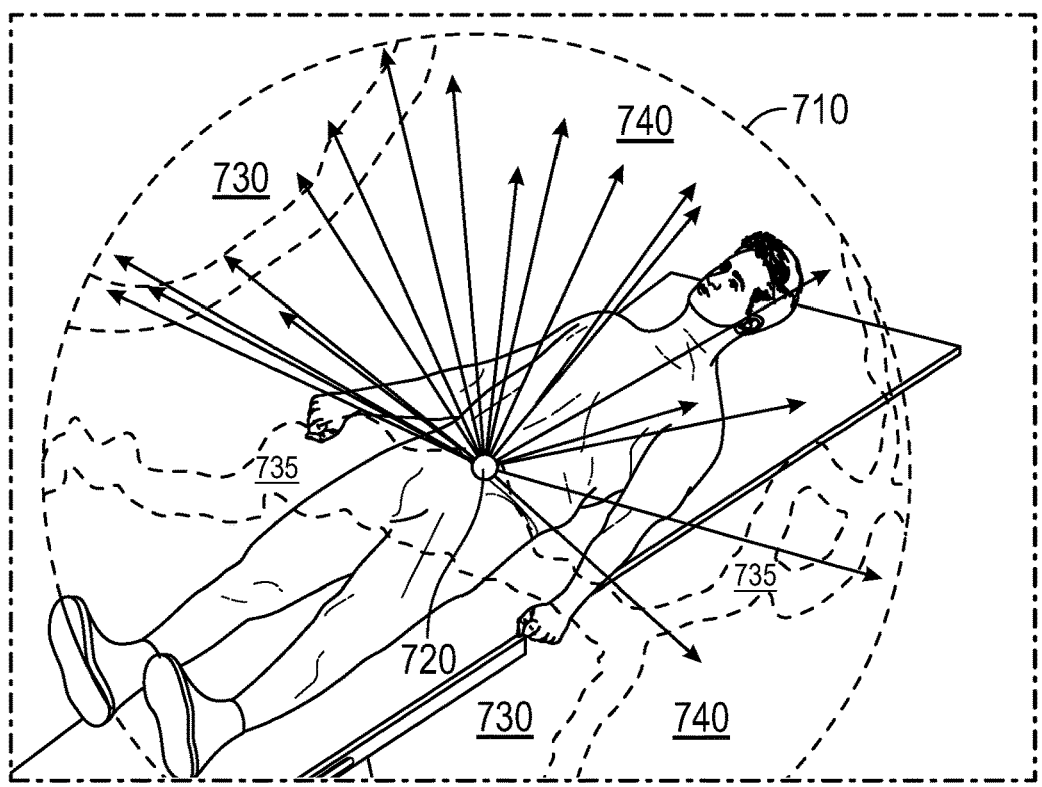
FIG. 7 illustrates another example user interface of the treatment planning system with areas of a sphere (which generally indicates the available positions for the treatment device, e.g., a robot tool center point ("TPC") in some embodiments, about an isocenter) indicating visual distinctions between high collision likelihood areas.

FIG. 7 illustrates another user interface of the treatment planning system with areas of the sphere 710 (which generally indicates the available positions for the treatment device about an isocenter 720) indicating visual distinctions between areas within the sphere based on likelihood of collision. For example, areas 740 may be shaded green (or some other visual indicator) to indicate a low likelihood of collision for beams originating from areas 740, while areas 730 are shaded red (or some other visual indicator) to indicate a high likelihood of collisions for beams originating from areas 730, and areas 735 are shaded yellow (or some other visual indicator) to indicate a moderate likelihood of collision for beams originating from areas 735. While three distinct areas are illustrated in the example of FIG. 7, in some embodiments gradients of any number of colors or other visual features may be used. For example, the area 735 between areas 740 and 730 may include a gradation from light green (on the border of area 740) to yellow, darker yellow, lighter yellow, then to light red on the border of area 730. In some embodiments, the 3D image may be manipulated in three dimensions, e.g., so that a user may zoom in to an inner portion of the sphere 710 and view the collision indicators/colors at different positions and distances from the isocenter (e.g., inside the sphere 710).

Figure 8:
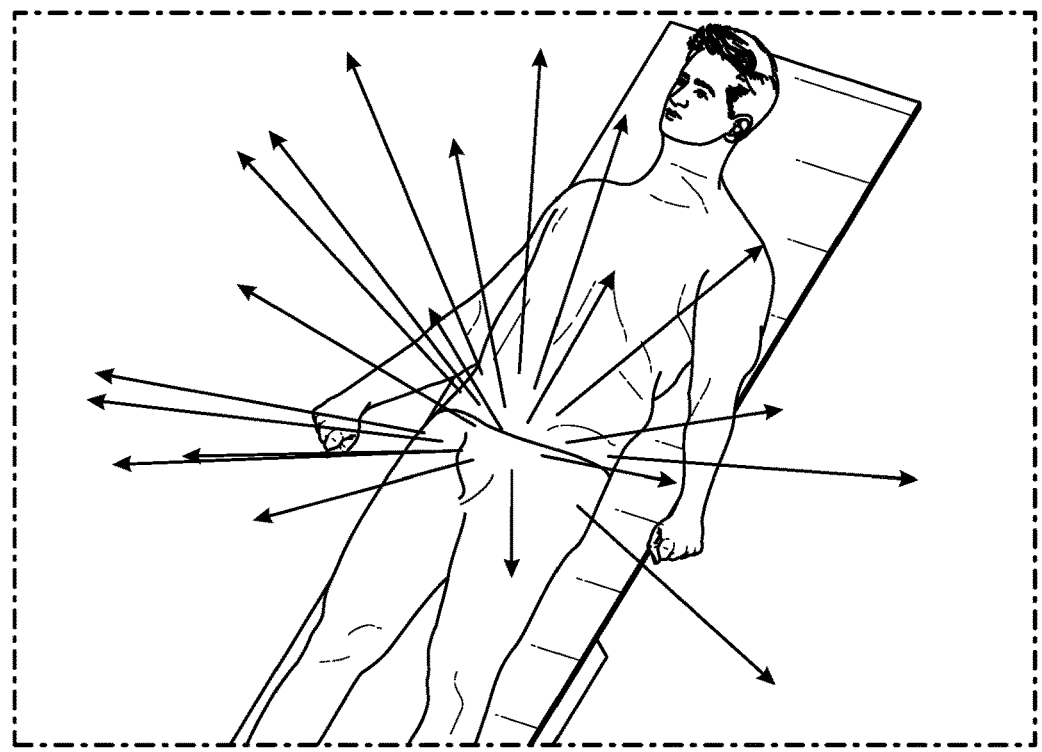
FIG. 8 illustrates another example user interface of the treatment planning system illustrating candidate beams available for a particular patient treatment plan.

FIG. 8 illustrates another example user interface of the treatment planning system illustrating candidate beams available for a particular patient treatment plan. In this example, the collision avoidance sphere (e.g., sphere 710 of FIG. 7) is not illustrated. Thus, in the example of FIG. 8, the treatment beams that have been selected for treatment of the prescribed radiation dose may be more easily viewed and analyzed.

Figure 9:
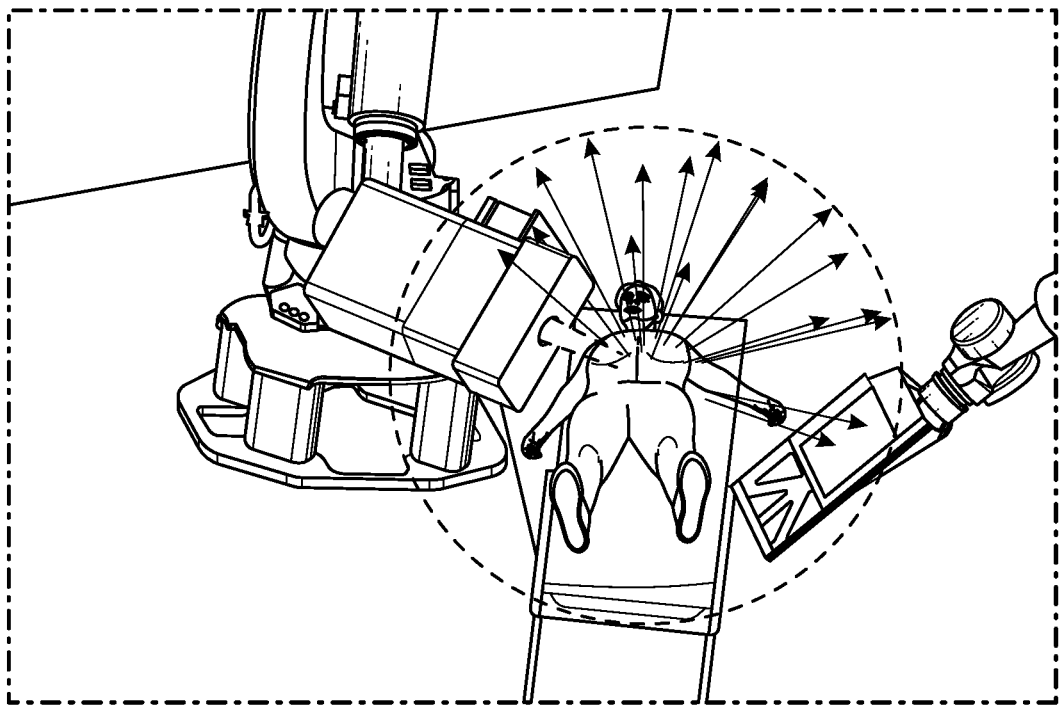
FIG. 9 and FIG. 10 illustrate example snapshots of a user interface that provides a walk-through of a current radiation treatment plan using a currently selected set of treatment beams.
Figure 10:
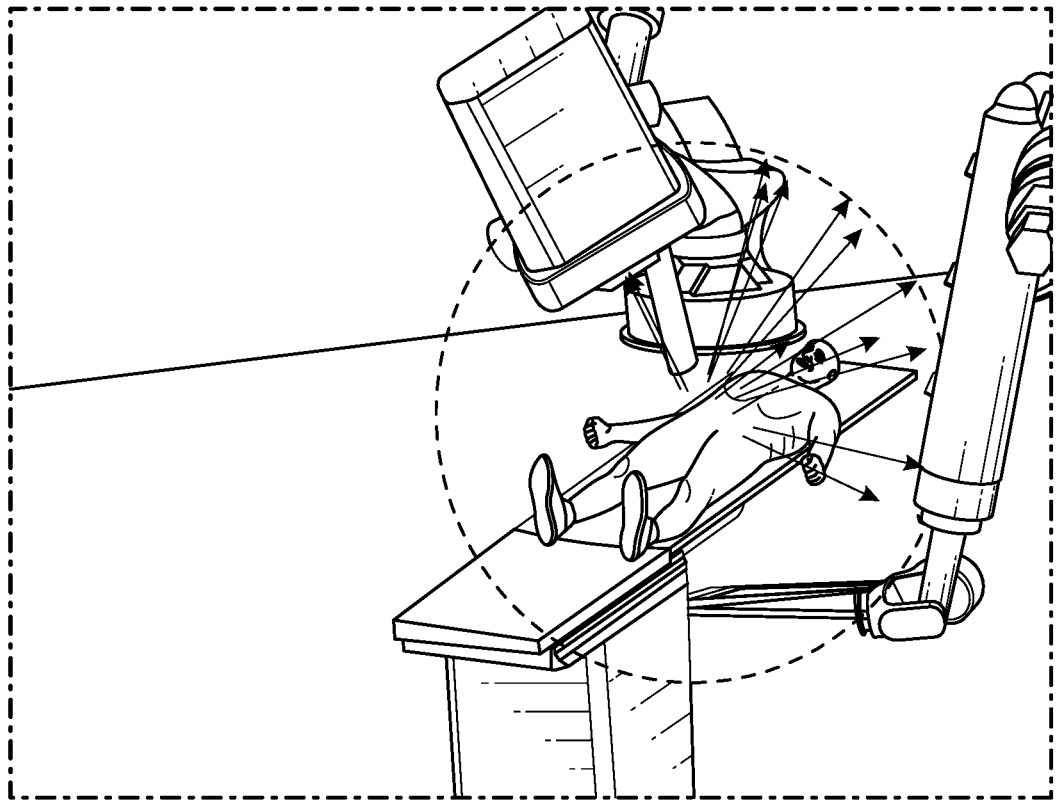
Figure 11A:
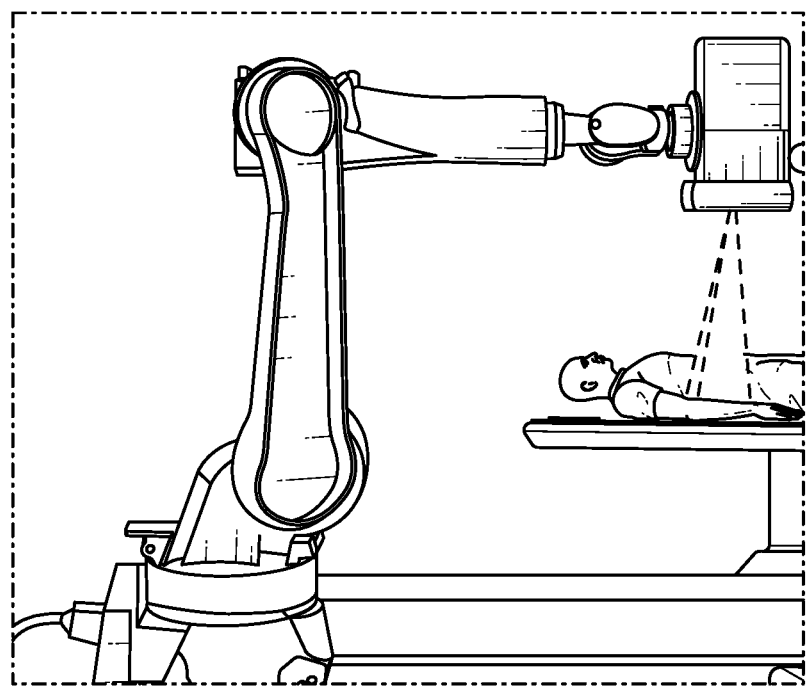
FIGS. 11A-11F illustrate additional example positions of a therapy device using an example primary robot.
Figure 11B:
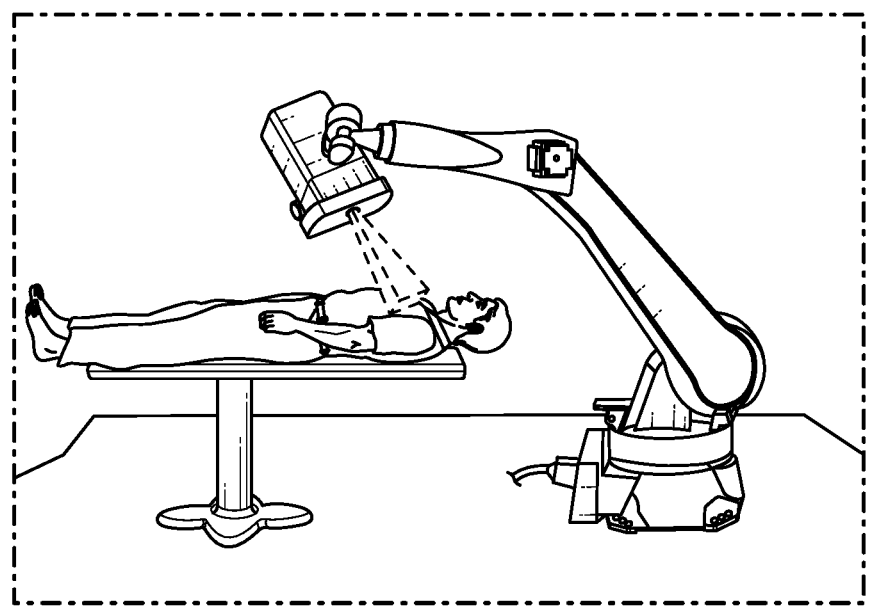
Figure 11C:
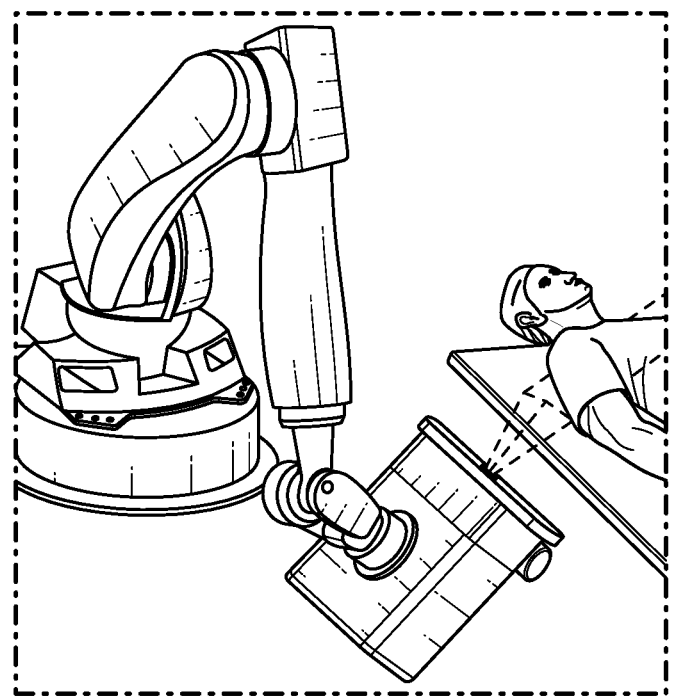
Figure 11D:
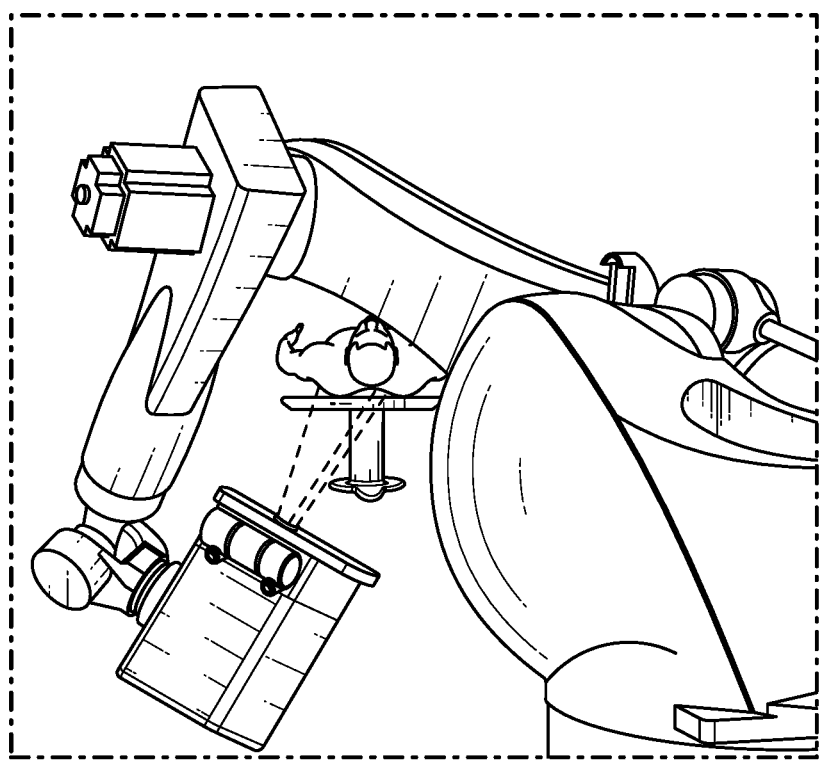
Figure 11E:
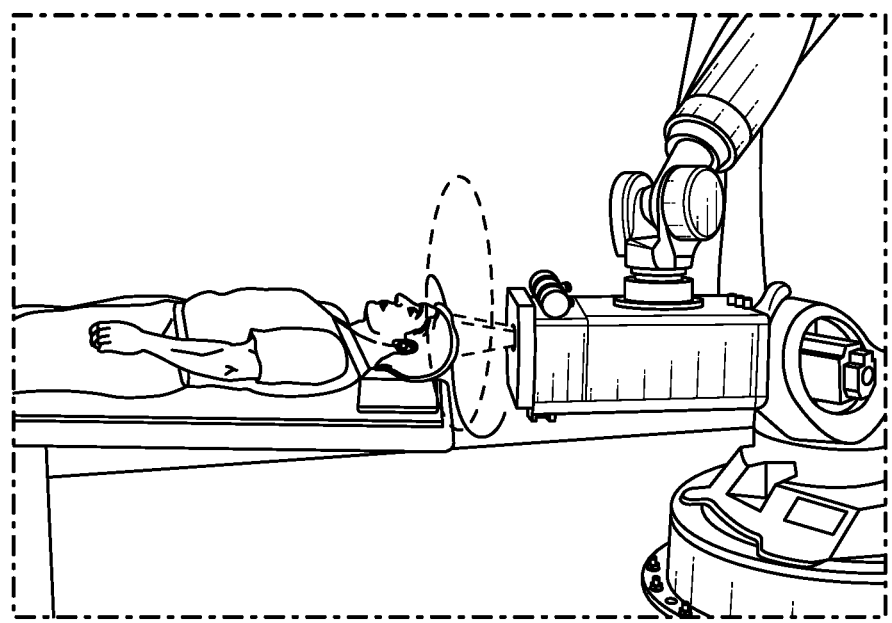
Figure 11F:
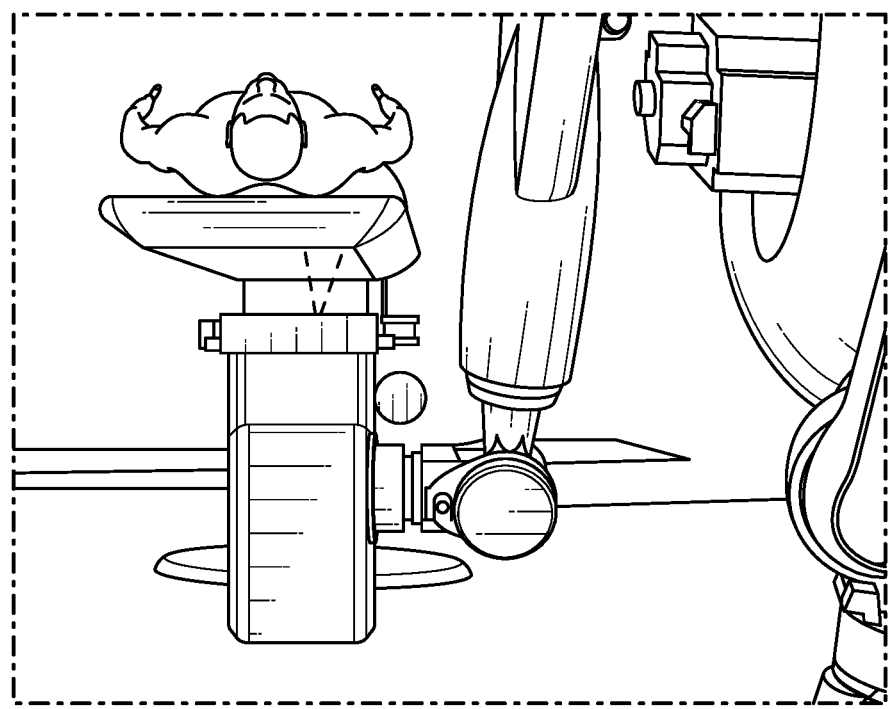

FIGS. 9 and 10 illustrate example snapshots of a user interface that provides a walk-through of a current radiation treatment plan using a currently selected set of treatment beams. In some embodiments, this simulation may occur well before the patient is actually brought into the radiation treatment environment (e.g., bunker with primary and secondary robots) for radiation therapy. For example, during a treatment planning stage the treatment planning software may generate a video (or other form of animations) indicating how the therapy delivery would be performed, for example, by cycling through (e.g., with animations or pre-rendered video) illustrations of where the primary and secondary robots (and other physical components within the treatment environment, such as the patient couch, the patient, walls, tables, etc.) are positioned for each prescribed dosage of radiation and how the robots move from one treatment beam to a next treatment being, etc.

FIGS. 11A-11F illustrate additional example positions of the therapy device using the example primary robot. FIGS. 11A-11F do not illustrate the secondary robot, but in operation the secondary robot may be positioned on the opposite side of the treatment bed/patient in a similar manner as shown in FIGS. 1, 4A, and 4B.

Example Registration

In existing radiation therapy systems, the patient is typically immobilized on a treatment couch to re-create positional conditions from an earlier simulation upon which the treatment plan was developed. For example, the patient may be immobilized with a thermoplastic mask, vac locks, wedges, and the like. The patient may be aligned with one or more tattoos to a particular position with reference to a fixed laser in the treatment room. The lasers may be mounted to bunker walls and point to a reference isocenter, and the patient/couch is moved to align with the laser.

An improved method of patient registration reduces the need to precisely align the patient position to the therapy system, thus reducing the burden and setup time for the therapist or technician. This system may reduce required precision or eliminate laser alignment of the patient to a machine isocenter. In one embodiment, a radiation therapy ("RT") plan is aligned to the patient/tumor location using in-room imaging data, such as cone-beam computed tomography ("CT") data, fan beam CT data, and/or any other relevant data. As noted above, use of six degrees of freedom ("6DOF") manipulators for the therapy delivery and imaging allows great flexibility in the therapy plan in view of the large range of positions available by the therapy robot. In some embodiments, the system knows the location of the CT image within the coordinate system of the imaging robot (e.g., the primary robot), as well as the relative position of the primary robot origin referenced to the secondary robot origin.

In some embodiment, the therapist may position the patient on the treatment couch with a mobilization device such as those noted above, but without the need to precisely position and reposition the patient on the treatment couch and within the room, such as may be done with room lasers and tattoos on the patient. Instead, articulating lasers mounted in the treatment room may be positioned to point to where the patient/couch should be positioned. For example, tattoos/stickers on the patient or markers on the treatment couch could be used for such positioning. This positioning provides the patient/couch in a zone where the imaging/therapy robots have maximum beam angle access and best accuracy for the patient treatment.

Depending on the embodiment, one or more 3D cameras, lidar systems, and/or motion capture cameras may be used to capture the patient position and ensure compliance to prescribed patient pose (head-first/feet-first, arms up/down, left/right side). 3D surface capture of the patient position may also be used for collision avoidance planning. Unlike gantry systems with a fixed circular path, the coupled radiation therapy system discussed herein has a significantly increase 3D volumetric flexibility. Thus, path planning to avoid collisions with the patient (and/or other objects) is increasingly important. In some embodiments, 3D surface capture of the patient position, e.g., indicating positions of arms, legs, etc., may be used in a treatment beam selection process, such as by filtering out candidate beams that have at least a threshold likelihood of colliding with the patient.

Various sensors and detectors, such as those configurations below, may be used for patient positioning prior to treatment and/or for generation of patent position data used in treatment plan development (e.g., to select treatment beams):

Stereo cameras, such as a camera (or multiple cameras) with two or more lenses and corresponding image sensors. Because the lenses of the stereo camera are offset, images from the multiple limits can simulate human but ocular vision and allow generation of distance sensing and 3D image generation.

3D camera or lidar (point cloud): a 3D camera or lidar monitors a workspace by generating a point cloud and providing feedback to the technician indicating where to position the patient in the workspace (e.g., a 4pi workspace).

3D camera with light pattern: A vision system may use deformation in a light pattern to discern patient volume/position and/or treatment couch position.

Motion tracking camera with markers: One or more motion tracking camera may be used in conjunction with reflective markers to discern patient volume/position and/or treatment couch position.

With any of these patient positioning configurations, a volume comparison between a monitored position (e.g., a point cloud) and a target volume position may be used to generate feedback and/or guidance to the technician as to where to place the patient/couch and an indication when a proper patient/couch position is accomplished.

This patient registration system may be used with a completely mobile treatment couch, where a patient can be prepped outside of the treatment room while another patient is being treated. When the current patient is completed with treatment and wheeled out, the next patient can be wheeled in. Since the system will locate the patient and therefore the patient tumor, having a fixed treatment couch is not necessary.

Example Beam Collision Modeling

Because of the great flexibility of the dual robot system discussed above, such as the independent moveability of the primary and secondary robots, additional safeguards to reduce risk of collision of the delivery system (or blocking system) with the patient, the treatment couch, the floor, other objects in the treatment area, etc. may be performed as discussed below. For example, with 6 degrees of freedom, up to 1162 candidate beams are available for delivery of therapy to a patient. This means that the treatment planning system has great flexibility in choosing beams for efficiency and safety optimized delivery of radiation therapy to a treatment area of a patient. Depending on the degrees of freedom in the robot system, the number of available beams may be larger or smaller.

Figure 12:
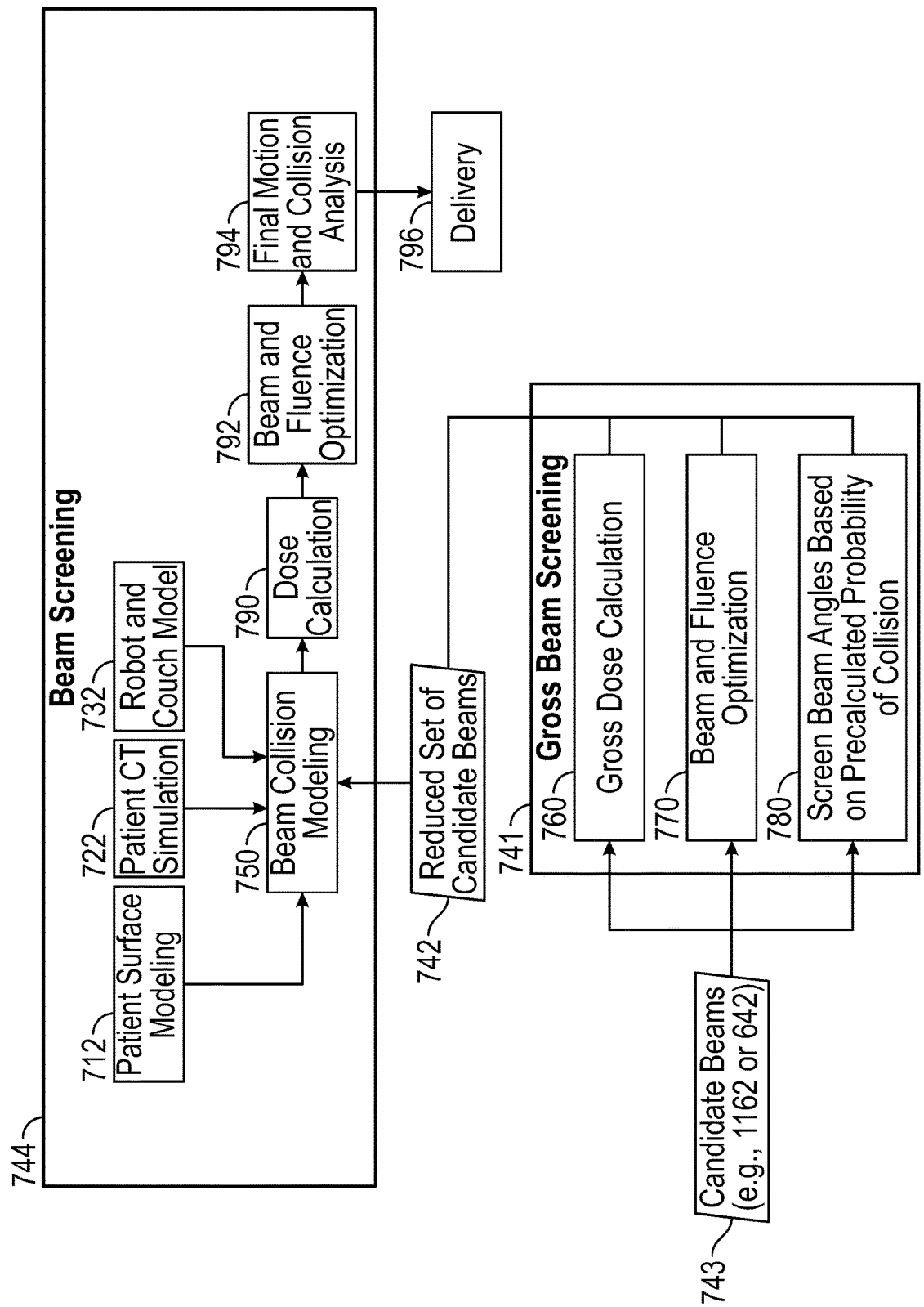
FIG. 12 is a flow diagram illustrating an example beam screening method that may be used by a treatment system, such as a dual robot system discussed herein.

FIG. 12 is a flow diagram illustrating an example beam screening method that may be used by the dual robot system discussed herein, such as by a treatment planning computer that develops the actual treatment plan for a patient (e.g. the software commands send to the robots, the radiation source, the imaging device, etc. to execute movements of the robots and delivery of therapy to the treatment area of a patient).

In general, the beam screening process reduces the number of candidate beams (e.g., angles at which a radiation beam may be incident on a treatment area of a patient) by removing beams associated with a high likelihood of collision with the treatment bed, the patient, or other equipment within the treatment facility, prior to selecting the treatment beams (and corresponding beam characteristics) that best achieve a radiation treatment goal and/or other user criteria. Additionally, the beam screening process may reduce the number of candidate beams by removing beams that would not practically be used for a particular radiation therapy, such as based on treatment area of the patient. For examples, beams that would enter through the feet of a patient may be removed from the treatment planning process when the treatment area is an area of the brain. Reductions in candidate beams for a particular treatment plan reduce the complexity and processing requirements of the system in creating a radiation treatment plan.

In the example of FIG. 12, the total quantity of candidate beams 743 includes all beams that are possible for a given robotics system. For example, in some embodiments a total of 1162 beams may be possible, while in another only 642 beams made possible. In other systems, other quantities of beams are possible. In the example of FIG. 7, a gross beam screening system 741 performs processes 760, 780, to produce a reduced set of candidate beams 742 that may then be used in the radiation treatment planning.

At block 760, a rough dose calculation is performed to determine general areas of therapy beams and areas of treatment avoidance. These areas can be selected based upon historical data, preset areas by radiation oncologist, and/or based upon machine learning analysis, for example. For example, the areas can be selected based upon avoidance of specific critical anatomical structures such as brain, heart, spinal cord, rectum, etc., and/or more general anatomical areas such as head, torso or waist. As one example, if the brain is being treated, the brain and/or head may not be excluded from the candidate beams that are available, but candidate beams corresponding to the chest and/or heart may be removed to reduce collateral damage to these areas that are not being treated. In some embodiments, an oncologist could place geometric shapes such as spheres or asymmetric masses to define areas of avoidance during this rough collision modeling phase.

In some implementations, the rough dose calculation at block 760 also includes a beam and fluence optimization process 770. For example, the number of candidate beams may be more efficiently reduced through use of larger voxels (volume element sizes) in the gross beam screening processes. Smaller voxels (finer resolution) may be used for determining the treatment plan (e.g., with the reduced set of candidate beams 742), but may not be necessary at the gross beam screening stage, thus allowing less processor intensive operations and quicker gross beam screening, improving the collision modeling performance.

At block 780, a collision avoidance process is performed to identify candidate beams that are in areas of higher probability of collision, and to remove those candidates beams in generating the reduced set of candidate beams 742. The collision areas can be determined based on historical data, preset areas by radiation oncologist, and/or based upon machine learning analysis, for example.

As discussed further below, in some embodiments a patient envelope indicative of position of a patient and, therefore, collision avoidance areas, may be determined. A patient envelope may comprise a geometric shape, such as an ellipse, sphere, cylinder, or a more conformal shape, based as based on the 3D surface capture of the patient with a predetermined offset distance.

In some embodiments, a candidate beam is determined to be in a high probability of collision with the patient if the point source (e.g., tip) of the treatment device intersects with the patient envelope, or is within a predetermine distance from the patient envelope.

The various processes discussed with reference to blocks 760 and 780 of the gross beam screening 741 may be performed sequentially or concurrently, depending on the implementation, such as by a treatment planning computing device. The reduced set of candidate beams 742 is then provided to a beam screening system 744, which may performs further beam screening based on inputs from a patient surface modeling 712, patient CT simulation 722, and/or a robot and couch model 732, for example. In some implementations, the gross beam screening system 741 also receives inputs from some or all of the patient surface modeling 712, patient CT simulation 722, and the robot and couch model 732, which may be used in the gross beam screening process. With the reduced set of candidate beams 742, rather than the full set of candidate beams 743, the beam collision modeling component 750 may more efficiently (e.g. using less processing power, memory, and time) provide a final set of beams (e.g., treatment beams) for dose calculation 790, beam influence optimization 792, and final motion and collision analysis 794, prior to delivery 796 of the beams to a treatment area of a patient. In some embodiments, the beam screening system optimizes a beam path, e.g., determines an order of delivering the determined treatment beams that minimizes overall movements of the robots.

Figure 13:
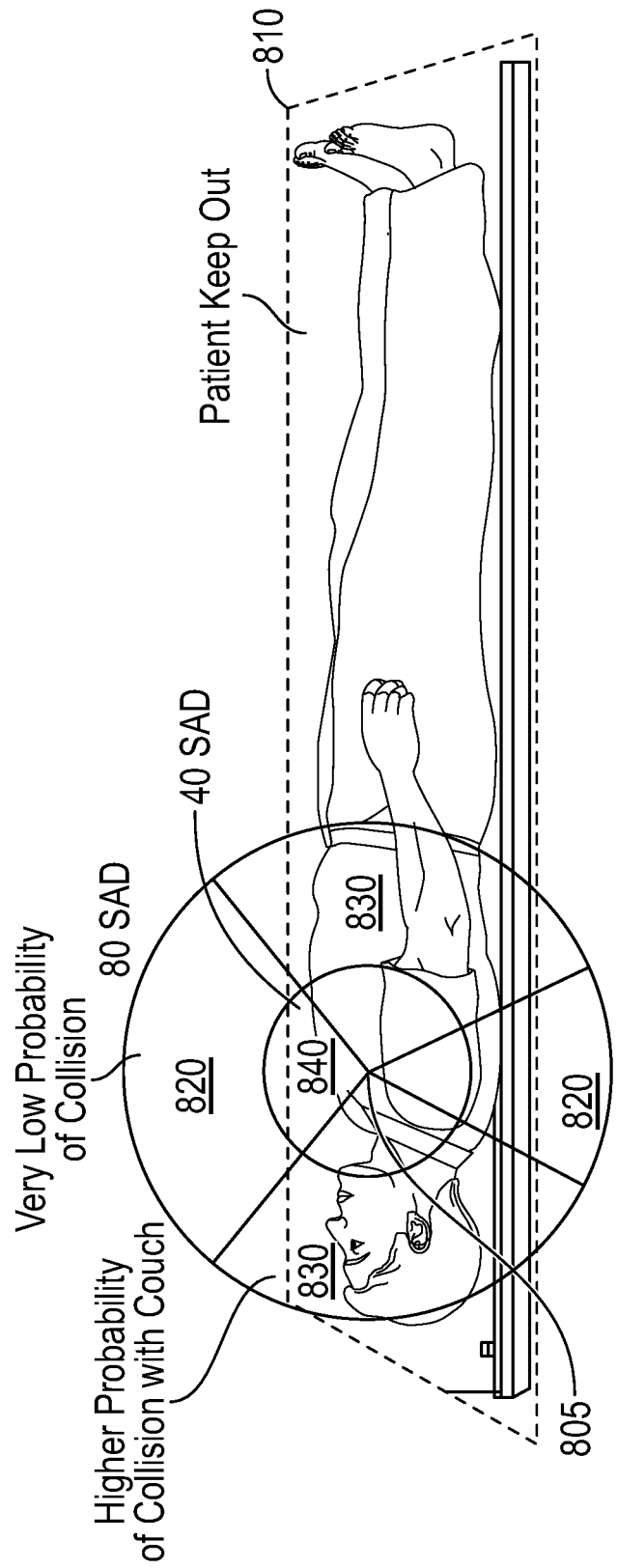
FIGS. 13-15 illustrate examples of collision likelihoods surrounding one or more isocenter.
Figure 14:
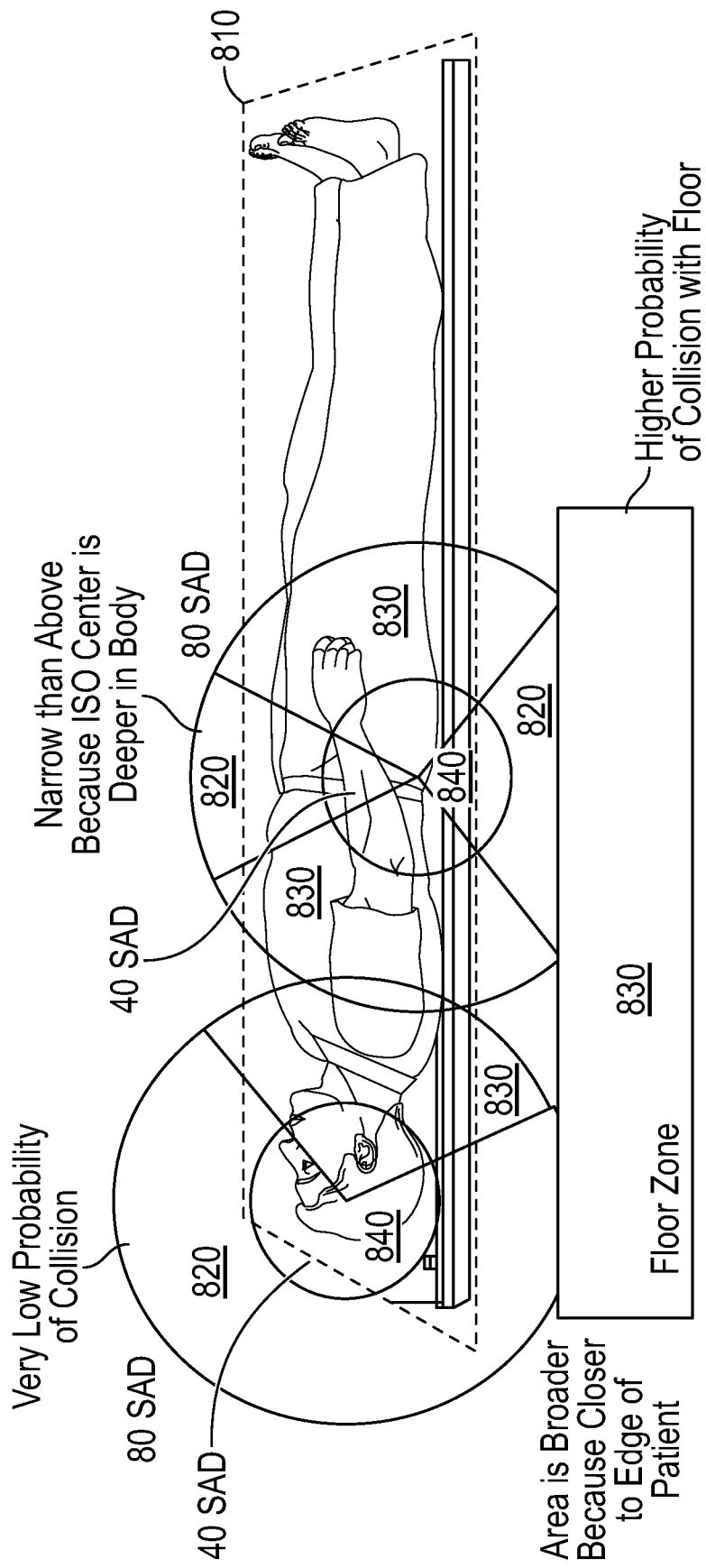
Figure 15:
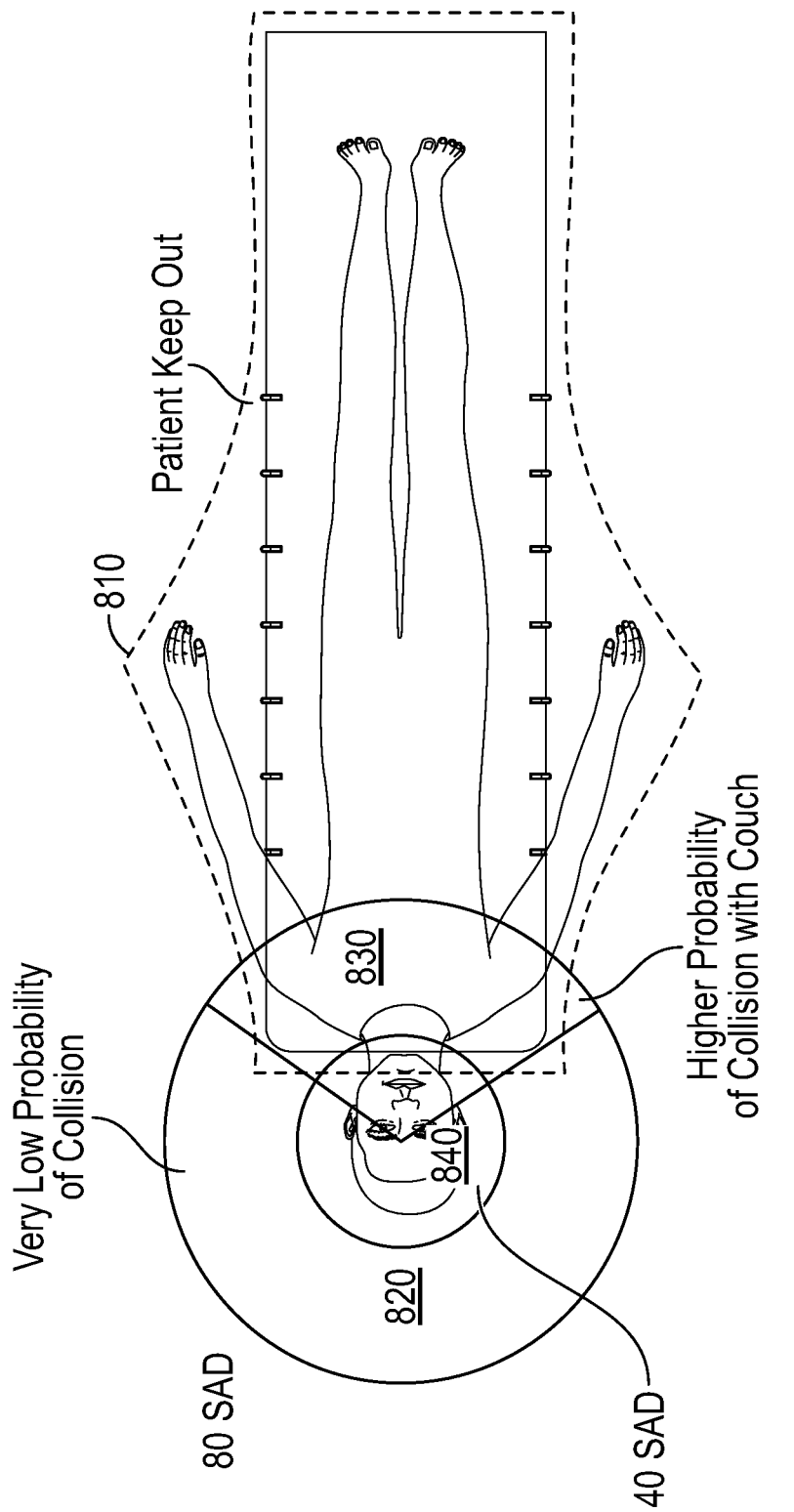

In some embodiments, the patient CT simulation 722 determines a patient envelope, which may be a cylinder, ellipsoid, or similar shape that surrounds the position of the patient on the treatment bed. For example, FIGS. 13-15 each include a patient envelope 810 that may be determined based on 3D surface capture, e.g., using any of the techniques discussed above and/or CT scan, of the patient on a treatment couch. The shape of the envelope 810 may vary between implementations. In some embodiments, areas of potential collision may be analyzed with reference to both the beam angles and source to axis distance ("SAD"). For example, FIGS. 13-15 illustrate collision likelihood areas 820, 830, 840, surrounding an isocenter 805. In these examples, the areas 840 indicate those with a high likelihood of collision (e.g., with the patient, the treatment bed, a floor, wall, etc.) due to a low SAD (e.g., less than a 40 cm radius from isocenter in this example) while the areas 830 indicate those with a higher probability of collision with an object or person based on the beam delivery angle conflicting with the object. The areas 820 indicate those beam angles with a low probability of collision. In some embodiments, the beam angles in area 830, the patient envelope 810, as well as those within SADs within the areas 840, may be excluded from candidate beams that are available for use as the treatment beams. This strategy reduces collision avoidance calculation time and processing constraints by excluding many of the available beams from the 4pi robotic system, such as by a factor of 10 or more (e.g., from 1,162 beams to less than 116 beams).

Example Beam Selection and Planning

In one example implementation, optional 4pi outputs may include one or more of: (1) available angles at max/min SAD, (2) available angles at max angle availability (variable SAD), and/or (3) available angles at fixed SAD or SAD range.

A treatment planning system may include a beam angle component that includes one or more of the following features:
   Selects the optimal beam angles and fluence for a tumor.
   Select one or more isocenter (e.g., centers of treatment that the beam focuses on).
   Select different SAD (source to axis distance) or Source to Isocenter Distance (SID), which describes the distance to one or more isocenters in the tumor since (rather than an 'axis' like traditional gantry systems).

In some embodiments, different SID may yield different number of candidate beams. For example, a shorter SID may have fewer candidate beams because the linac head is closer to the patient. However if the tumor is located towards the posterior of the patient then there may be more beams available in that location because it will clear the space between the bottom of the treatment couch and the floor. Treatment wise, an oncologist may select a shorter SID to treat smaller tumors or if they need a tighter beam.

Likewise, an oncologist may select a longer SID if the tumor is towards the anterior of the patient and they want the greatest number of candidate beams for better tumor control.

In some implementations, the system allows a user, such as an oncologist, to select one or more of the options below as part of a treatment plan generation:
   Available angles at max/min SID. Max and Min may be user-adjustable (or automatically adjusted by the system), such as in a range to define a max of 80 cm or more and a min of 40 cm or less. This determines, for example, the quantity of candidate beams at either the maximum SID or the minimum SID. In some embodiments, the SID will be constant across the candidate beams (e.g., the perimeter of the spheres 610, 710 in FIGS. 6 and 7). In some embodiments, if a collision is detected with the patient, treatment couch, floor or other object, then the beam angle is removed from the list of candidate beams.
   Available angles at max angle availability (variable SID). This selection tries to find the maximum number of beams possible for the given tumor location. For example, the algorithm may vary the SID on a beam-to-beam basis to identify available candidate beams. In other words, one beam may be 50 cm and the next 80 cm and so on. There can be a selection on this feature that biases the selection to max distance or minimum distance or some fixed range. For example, if it is set to maximum, it will use 80 cm (or other maximum) until it collides with an object such as the floor, then it will find the maximum SID to avoid collision. Similarly, if set to minimum, it will use 40 cm (or other minimum) until it collides with an object such as the patient and find the minimum SID to avoid collision. It will be a maximum or minimum or some range in between envelope.
   Available Angles at fixed SID or SID range. This selection defines a fixed SID or an SID range to select candidate beams and finds the maximum number of beams within that selection that avoids collisions with patient, treatment couch, floor and any other object. Using this option, the algorithm will not try to find another SID with the collision field. It will just discount the beam angle from the candidate beams.

Example Optimization and Path Planning

In some embodiments, an optimization engine, which may be part of a treatment planning system and/or a separate computing system, performs filtering of candidate beams remaining after robot reachability and collision avoidance (e.g., reducing candidate beams by more than 50%). The optimization engine may execute an algorithm that filters out remaining candidate beams based on one or more of several criteria, such as tumor physic, tumor size, and/or other criteria (e.g., to reduce candidate beams to a predetermined number of treatment beams, such as 20). In some embodiments, path costs for candidate beams may be calculated and used to further reduce the candidate beams to a final set of treatment beams. For example, path costs associated with each of multiple candidate paths (e.g., combinations of candidate beams that deliver the prescribed radiation) may be calculated and compared to identify and select candidate beams having the lowest path cost as the treatment beams.

In some embodiments, individual candidate beams may be filtered out of the remaining set of candidate beams based on beam path costs. For example, the cost of a robot path associated with a candidate beam (e.g., which may be based on a distance the primary and/or secondary robots need to travel from a previous candidate beam) may be used to reduce a quantity of beams from a set of two or more beams each having the same (or similar) clinical value. For example, if two beams have equal clinical value, but one has a higher beam path cost, the beam with the higher beam cost may be filtered out of the remaining candidate beams. However, in some implementations a higher clinical value, of even a small amount, may be preferred over a more optimal beam path, of even a large amount.

In some embodiments, a beam path is a trajectory the robot tool center point or "TCP" (e.g., could be the position of the primary robot where the therapy beam exits the therapy device) follows to travel from one beam to another. For example, beam paths may be straight lines between treatment beams (e.g., 3D vector points or nodes) or may be arcs between the treatment beams (e.g., arcs along the perimeter of sphere 610 or 710).

In some embodiments, optimization of a beam path for a set of treatment beams (e.g., 20 beams selected from 1,162 candidate beams) may be performed based on overall path costs. In general, a path cost is a distance the robot (e.g., the tool center point or "TCP" of the robot) travels from one beam to the next beam. A total cost for a set of treatment beams (or other set of beams) may be the sum of the individual path costs associated with each pair of adjacent treatment beams. In some embodiments, an order (e.g., sequence) of delivery of the treatment beams is determined based on optimization (e.g., minimization) of the total path cost. In some embodiments, total cost may be calculated for multiple different sequences of the treatment beams (e.g., different ordering of the same 20 beams) to identify a sequence with the lowest total cost, such as by using a brute-force or traveling salesman algorithm in identifying different sequences.

In some embodiments, a beam path (e.g., sequence of advancing through the treatment beams) may be determined by analyzing clusters of treatment beams, such as by using a clustering process that allows division of the overall path planning into chunks. For example, beam path planning may be performed by:

Dividing treatment beams into clusters, such as based on a k-means and/or other clustering algorithm. For example, the beam angles of the treatment beams may be assigned to clusters, e.g., clusters of no more than 5 (or some other quantity). In some embodiments, the three-dimensional area that is available for treatment beams (e.g., within the spheres 610, 710) may be divided into volume segments, and a cluster that includes treatment beams within a volume segment may be created for each volume segment.

a path between the treatment beams in each cluster is optimized, such as to reduce the distance traveled by the primary (and/or secondary) robots (e.g., using a brute-force algorithm or traveling salesman algorithm)

a path between adjacent clusters is optimized, such as to reduce the distance traveled by the primary (and/or secondary) robots (e.g., using a brute-force algorithm or traveling salesman algorithm)

In some embodiments, a calculated path plan may be monitored and/or updated during a therapy delivery session (using the path plan). For example, a safety envelope around a patient may be monitored for potential collision based on actual positions of the robots within the treatment environment, such as may be determined by ultrasound and/or sensors (e.g., cameras).

IMPLEMENTATION DETAILS AND EMBODIMENTS

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein (e.g., by the treatment planning system, beam screening system, gross beam screening system, and/or other devices or systems) may be performed as software instructions are executed by, and/or in response to software instructions being executed by, one or more hardware processors and/or any other suitable computing devices. The software instructions and/or other executable code may be read from a computer readable storage medium (or mediums). Computer readable storage mediums may also be referred to herein as computer readable storage or computer readable storage devices.

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid-state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid-state drive) either before or after execution by the computer processor.

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows 11, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general-purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A radiation treatment system comprising:
    a primary robot;
    a therapy device mechanically coupled to the primary robot, wherein the primary robot is configured to move the therapy device to selectively deliver a therapy beam along a therapy longitudinal axis to a treatment area of a patient at a plurality of treatment beam orientations selected from a plurality of candidate beam orientations;
    a secondary robot;
    a radiation block mechanically coupled to the secondary robot, wherein the secondary robot is configured to move independent of a patient couch and independent of movements of the primary robot so that the therapy longitudinal axis of the therapy beam is incident on a central portion of the radiation block after traveling through the treatment area of the patient; and
    a robot guidance system comprising one or more computer processors executing software instructions configured to instruct movements of the primary robot and the secondary robot according to a radiation therapy treatment plan, wherein the radiation therapy treatment plan includes, for individual therapy beams of the treatment plan:
        a first instruction to the primary robot to move to a first position;
        a second instruction to the secondary robot to move to a second position wherein the therapy longitudinal axis from the therapy device mechanically coupled to the primary robot is incident on the central portion of the radiation block mechanically coupled to the secondary robot; and
        deliver the therapy beam.

2. The radiation treatment system of claim 1, further comprising:
    an imaging device mechanically coupled to the primary robot, wherein the primary robot is configured to move the imaging device concurrent with movement of the therapy device to deliver an imaging beam along an imaging longitudinal axis to the treatment area of the patient; and
    an imaging detector mechanically coupled to the secondary robot, wherein the secondary robot is configured to move independent of the patient couch and in coordination with movements of the primary robot so that the imaging longitudinal axis is incident on a central portion of the imaging detector after traveling through the treatment area of the patient.

3. The radiation treatment system of claim 2, wherein an offset angle between the imaging longitudinal axis and the therapy longitudinal axis is less than about 15 degrees.

4. The radiation treatment system of claim 3, wherein the offset angle is less than about 5 degrees.

5. The radiation treatment system of claim 2, wherein the imaging detector is positioned on the secondary robot adjacent the radiation block.

6. The radiation treatment system of claim 5, wherein the imaging detector is positioned nearer to the patient than the radiation block.

7. The radiation treatment system of claim 1, wherein the plurality of candidate beam orientations includes 1,162 candidate beam angles.

8. The radiation treatment system of claim 1, wherein the therapy beam is a high-energy X-ray beam.

9. A computing system comprising:
    a hardware computer processor; and
    a non-transitory computer readable medium having software instructions stored thereon, the software instructions executable by the hardware computer processor to cause the computing system to perform operations comprising:
    accessing patient information including at least an isocenter of a patient with reference to a radiation treatment environment, wherein the radiation treatment environment includes at least:
        a patient treatment couch;
        a primary robot configured to move a therapy device about the patient, the therapy device configured to transmit a therapy beam along a therapy longitudinal axis; and
        a secondary robot configured to move a radiation blocker about the patient, the radiation blocker comprising a high-z material configured to absorb the therapy beam, wherein the primary robot and secondary robot are each independently moveable with reference to the patient treatment couch;
    identifying a plurality of candidate beam angles, wherein each candidate beam angle intersects with the isocenter of the patient at one of a corresponding plurality of a different angles;

for each of the plurality of candidate beam angles:
estimating position of the primary robot when positioned to deliver the therapy beam at the candidate beam angle;
estimating position of the secondary robot when positioned to receive the therapy beam delivered at the candidate beam angle;
determining whether one or more of the estimated positions of the primary robot or the secondary robot are less than a threshold distance from a patient envelope indicating a boundary around the patient; and
in response to determining that one or both of the estimated position of the primary robot and the estimated position of the secondary robot are less than a threshold distance from the patient envelope, excluding the candidate beam angle from a set of treatment beam angles; and generating a treatment plan including, for individual of the treatment beam angles in the set of treatment beam angles:
a first position of the primary robot;
a second position of the secondary robot, wherein the therapy longitudinal axis from the therapy device mechanically coupled to the primary robot is incident on the central portion of the radiation blocker mechanically coupled to the secondary robot.

10. The computing system of claim 9, wherein the isocenter comprises three-dimensional coordinates indicating a treatment area of the patient.

11. The computing system of claim 9, wherein the patient information includes a maximum radiation dosage.

12. The computing system of claim 9, wherein the patient envelope comprises a geometric shape determined based on a 3D surface capture of the patient.

13. The computing system of claim 9, wherein the threshold distance from the patient envelope is zero.

14. The computing system of claim 9, further comprising: determining an optimized path between the treatment beams.

15. The computing system of claim 14, wherein the optimized path is determined based on analysis of clusters of treatment beams.

16. The computing system of claim 9, further comprising one or more graphics processing unit ("GPU") servers configured to perform one or more of said:
estimating position of the primary robot when positioned to deliver the therapy beam at the candidate beam angle;
estimating position of the secondary robot when positioned to receive the therapy beam delivered at the candidate beam angle;
determining whether one or more of the estimated positions of the primary robot or the secondary robot are less than a threshold distance from an estimated position of the patient on the patient treatment bed;
in response to determining that the estimated positions of the primary robot and the estimated positions of the secondary robot are more than a threshold distance from the estimated position of the patient, excluding the candidate beam angle from a set of treatment beam angles; and
generating a treatment plan including the set of treatment beam angles.

* * * * *